US009201561B2

(12) United States Patent
Montague

(10) Patent No.: US 9,201,561 B2
(45) Date of Patent: Dec. 1, 2015

(54) ROTATABLE OBJECT SYSTEM FOR VISUAL COMMUNICATION AND ANALYSIS

(76) Inventor: Roland Wescott Montague, North Saanich (CA)

( * ) Notice: Subject to any disclaimer, the term of this patent is extended or adjusted under 35 U.S.C. 154(b) by 456 days.

(21) Appl. No.: 13/470,288

(22) Filed: May 12, 2012

(65) Prior Publication Data

US 2013/0301953 A1    Nov. 14, 2013

(51) Int. Cl.
*G06F 3/0481* (2013.01)
*G06Q 30/02* (2012.01)

(52) U.S. Cl.
CPC .......... *G06F 3/0481* (2013.01); *G06Q 30/0241* (2013.01)

(58) Field of Classification Search
None
See application file for complete search history.

(56) References Cited

U.S. PATENT DOCUMENTS

| | | | | |
|---|---|---|---|---|
| 5,825,871 | A * | 10/1998 | Mark | 379/357.03 |
| 6,769,131 | B1 * | 7/2004 | Tanaka et al. | 725/105 |
| 7,773,100 | B2 | 8/2010 | Montague | |
| 8,085,982 | B1 * | 12/2011 | Kim et al. | 382/103 |
| 8,739,019 | B1 * | 5/2014 | Nevins | 715/203 |
| 8,914,744 | B2 * | 12/2014 | Spencer et al. | 715/800 |
| 8,990,258 | B2 * | 3/2015 | Bhatia | 707/793 |
| 2002/0105529 | A1 * | 8/2002 | Bowser et al. | 345/629 |
| 2002/0161569 | A1 * | 10/2002 | Itoh et al. | 704/2 |
| 2004/0075619 | A1 * | 4/2004 | Hansen | 345/1.1 |
| 2006/0045312 | A1 * | 3/2006 | Bernstein et al. | 382/103 |
| 2007/0064947 | A1 * | 3/2007 | King et al. | 380/270 |
| 2008/0005677 | A1 * | 1/2008 | Thompson | 715/744 |
| 2008/0028286 | A1 * | 1/2008 | Chick | 715/208 |
| 2008/0208652 | A1 * | 8/2008 | Srivastava | 705/7 |
| 2008/0222552 | A1 | 9/2008 | Batarseh et al. | |
| 2008/0243486 | A1 * | 10/2008 | Summitt | 704/10 |
| 2008/0288855 | A1 * | 11/2008 | Issler et al. | 715/205 |
| 2009/0177538 | A1 * | 7/2009 | Brewer et al. | 705/14 |
| 2009/0217177 | A1 * | 8/2009 | DeGrazia | 715/753 |

(Continued)

FOREIGN PATENT DOCUMENTS

JP          10042279 A   *  2/1998
JP       2003131552 A   *  5/2003

OTHER PUBLICATIONS

Jankowski, Jacek, and Stefan Decker. "2lip: Filling the gap between the current and the three-dimensional web." Proceedings of the 14th International Conference on 3D Web Technology. ACM, 2009.*

(Continued)

*Primary Examiner* — Michelle Entezari

(57) ABSTRACT

Visually defining terminology in a paragraph by invoking a multi-media viewer to rotate a subject-object and zoom-in on the associated feature in response to clicking on the terminology; higher resolution, or a different image capture technique is then overlaid. Viewer re-positions near terminology clicked. Clicking on a feature answers a question. Two viewers are synchronized to display the same pose to facilitate a phone conversation; synchronization session is initiated by a pattern of sounds transmitted over the phone. Viewer analytics information is a heat map indicating angles seen, paused, zoomed-in, or terminology clicked; ranks different marketing message wording. After webpage loads, an image having a special pattern within its filename is replaced with multi-media viewer. Upon loading or providing additional subject-object data, advertisements are shown if a subscription fee is not paid. Clipboard data is copied to another computer by a pattern of sounds transmitted over the phone.

36 Claims, 15 Drawing Sheets

(56) References Cited

U.S. PATENT DOCUMENTS

| | | |
|---|---|---|
| 2010/0049629 A1* | 2/2010 | Rathod et al. ............... 705/27 |
| 2010/0145678 A1* | 6/2010 | Csomai et al. ............... 704/9 |
| 2010/0177786 A1* | 7/2010 | Signaoff et al. ............ 370/466 |
| 2010/0332962 A1 | 12/2010 | Hammer |
| 2011/0022942 A1* | 1/2011 | Flemings et al. .......... 715/230 |
| 2012/0042277 A1 | 2/2012 | Lin-Hendel |
| 2012/0084661 A1 | 4/2012 | Gil et al. |
| 2012/0243765 A1* | 9/2012 | Buelow et al. ............. 382/131 |
| 2013/0016884 A1* | 1/2013 | El-Hilo et al. ............. 382/128 |
| 2013/0030908 A1* | 1/2013 | Gessner et al. ............ 705/14.45 |

OTHER PUBLICATIONS http://www.healthline.com/human-body-maps—recorded as early as May 8, 2011.*

Useing Adobe Acrobat X Pro, Adobe Systems Inc, Last revised Oct. 11, 2011 retrieced on Oct. 8, 2013. Retrieced from the internet<URL: http://help.adobe.com/en_US/acrobat/X/pro/using/acrobat_X_pro_help.pdf>.

* cited by examiner

<IMG src = site1.com / r0005_3dr_widget.jpg ? key=123 width=300 height=200 />

903  904  901           902

ROTATABLE OBJECT SYSTEM FOR VISUAL COMMUNICATION AND ANALYSIS

BACKGROUND OF THE INVENTION

The present invention relates to information based website documents with embedded multi-media viewer software. Some multi-media viewers allow a user to rotate a subject object to see the back or zoom in for a closer look, where the subject object is a three dimensional numeric model or photographs of a real physical subject object taken from a multitude of different angles.

Typically, these multi-media viewers are embedded within a webpage that also describes the features of the subject object and the benefits one may want to be aware of when considering to purchase the subject object. Often webpage designers will allocate 25% of the page space to a multi-media viewer and 75% of the page space to standard HTML text which describes various parts or features of the object. HTML text which resides outside of a multi-media viewer is very important for search engine indexing and the ranking of a webpage in the search results.

More complicated documents often have special industry terms, phrases, or names in paragraphs that describe an operation of a subject object or its benefit, such as "the second stage choke lever, on the back side of the widget right next to the throttle mixture screw, is very important to consider when making a purchase".

Multi-media viewers are typically embedded into a webpage using <applet></applet>, <iframe></iframe>, <script></script>, <object></object>, or <embed></embed> tags, there are many attributes or parameters that are passed to the viewer software such as the code base location, application file name, data file names, and viewer size. The result is often many lines of HTML code that are relatively complex for the abilities of a graphic designer designing the website or authors tasked with writing the text content in the web-page document. The disadvantage is that people tend not to use things that are more complex than they are comfortable with.

Advantages

Thus several advantages of one or more aspects are providing an easier way for a user to insert a multi-media viewer into a website document. The significant advantage is a non-technical author can more quickly create rich and interactive website documents while focusing on tasks that use their unique skills of writing and communicating ideas. Another significant advantage is multi-media viewers are more easily inserted into a website shopping cart system by data entry personnel. Another advantage is multi-media viewers are more easily inserted into authoring tools such as blogs, wiki's, wysiwyg programs, and website creation software used within a web-browser.

Other advantages of one or more aspects are more efficiently communicating the meaning of unfamiliar industry terminology to new customers or students. The significant advantage is the reader can focus mind power on the concepts described in the paragraphs rather than being distracted for a period of time to find the meanings of certain new words. Another significant advantage is shorter sentences can be used to explain benefits or ideas so the message is more easily understood by the reader, as well as, the shorter sentences provide extra space on the page to describe additional benefits.

Other advantages of one or more aspects are to improve understanding and communication between people speaking while each is in front of different computers. The significant advantage is all participants are clear about which physical feature of the subject-object is being discussed and therefore confidence increases that the ideas being discussed are much more likely to be understood by everyone. Another significant advantage is a customer service representative or salesperson can be more persuasive while on the phone with a customer.

Other advantages of one or more aspects are to evaluate a person's understanding of the physical features of a subject-object. The advantage is students can be more affectively tested and certified that they possess the knowledge required, as well as, different styles of examination questions can be asked and answered.

Other advantages of one or more aspects are to evaluate the effectiveness of sentences and paragraphs which describe benefits or concepts usually in the form of a marketing message. The advantage is an author can receive feedback on a paragraph's ability to engage people and measure the effect of any changes to the wording.

Other advantages of one or more aspects are to evaluate a person's desire to purchase a first subject-object instead of a second subject-object and what physical features of a subject-object are most interesting to the person or group of people.

These and other advantages of one or more aspects will become apparent from a consideration of the ensuing description and accompanying drawings.

BRIEF SUMMARY

According to one embodiment of the present invention, loading a multi-media viewer into a webpage by searching the document for an image having a filename that partly comprises a predetermined pattern of characters and where the other parts of the filename indicate which media content to load into the multi-media viewer. The multi-media viewer is then located in the same position and size as the found image. The advantage of one or more aspects is the webpage author only needs the ability or tools to insert JPG images into the webpage document in order to have a complex multi-media viewer and content to display in the image's place.

According to one embodiment of the present invention, within a paragraph of text on a webpage, a terminology is associated with a predetermined pose (angle and zoom) of a subject-object displayed in the multi-media viewer. Once the terminology is clicked, the viewer displays the predetermined pose to point out what the terminology visually looks like and where that feature is located on the subject-object, such as the back-side. The advantage of one or more aspects is the user can be reading a paragraph then click on an unfamiliar terminology to gain more understanding of what is being described. Other advantages is marketing messages can be made shorter, be more focused on benefits, and are safe to use industry specific terminology that may be unfamiliar to new buyers of the product.

According to one embodiment of the present invention, the multi-media viewer is repositioned within the document to be nearer to the unfamiliar terminology after it is clicked by a user needing a visual definition by seeing a predetermined pose of the subject-object. The advantage of one or more aspects is the webpage can be longer than the screen, where scrolling makes the multi-media viewer no longer visible, yet clicking a terminology brings the multi-media viewer back into sight.

According to one embodiment of the present invention, clicking on terminology associated with a predetermined pose, loads in additional detail comprised of much higher resolution or different technique of image capture of the subject-object. The advantage of one or more aspects is even more information can be communicated to the user, and file sizes can be made smaller compared to providing all angles of the subject object at the much higher resolution.

According to one embodiment of the present invention, determining multi-media viewer analytics information by logging user actions with the viewer user-interface or terminology clicked. The advantage of one or more aspects is an analyst can be provided a heat map report on what features of subject-object are most interesting to website visitors.

According to one embodiment of the present invention, providing different marketing messages to different users and collecting viewer analytics data of user-interface actions and terminology clicked for the respective message versions. The advantage of one or more aspects is an analyst can measure or get feedback on how effective a particular message wording is to invoke a user to interact with the subject-object.

According to one embodiment of the present invention, creating a new association of a terminology to a predetermined pose of the subject-object by utilizing the viewer user-interface to rotate and zoom-in on the feature, then selecting the terminology on the webpage, and clicking a button to create the new association. A search phrase comprising the selected terminology is increased in size until only one occurrence is found in the webpage. Upon the viewer loading, the terminology is found and associations with the respective predetermined poses are created. The advantage of one or more aspects is associations between terminology and predetermined poses can be easily made by a user to visually explain what feature they mean on the subject-object.

According to one embodiment of the present invention, displaying an advertisement in the multi-media viewer position while the viewer code and subject-object data are loading.

According to one embodiment of the present invention, displaying an advertisement in exchange for providing the user with additional subject-object data, such as more angles for smoother rotation, higher resolution to allow the user to zoom-in farther, or a more accurate measurement tool. A user can purchase a subscription to avoid the advertisements. The advantage of one or more aspects is the costs of hosting the larger file sizes can be subsidized, while providing a better user experience with rotation motion that is less jerky and/or provide much more detail to zoom-in on.

According to one embodiment of the present invention, testing student knowledge of subject-object features by rotating to and clicking on a hotspot as the method of answering the question.

According to one embodiment of the present invention, synchronizing two or more multi-media viewers embedded in webpages displayed on two or more computers, such that both multi-media viewers display the same pose of the subject-object. The advantage of one or more aspects is that a first user can discuss the subject-object over the phone while rotating the subject-object or clicking on associated terminology on the first computer and have the second user see the same pose of the subject-object on the second computer.

According to one embodiment of the present invention, a synchronization session between two multi-media viewers is initiated by a pattern of sounds that are transmitted over the phone. The advantage of one or more aspects is that a first user can easily synchronize with a second user they are already talking to on the phone, by pressing a button that causes audible sounds to transmit from the first computer's speakers through the phone microphone, through the phone network, and received by the second user's computer microphone which then decodes the audio sounds and sends a "begin synchronization with first computer" command through the computer network to the synchronization server.

According to one embodiment of the present invention, text copied to a clipboard on a first computer can be pasted on a second computer via a pattern of sounds that are transmitted over the phone. The advantage of one or more aspects is that a first user can easily and accurately communicate an email-address with a second user that they are already talking to on the phone without having to spell out each character.

Other novel features and embodiments of the present invention will become apparent from a consideration of the ensuing description and accompanying drawings.

BRIEF DESCRIPTION OF THE DRAWINGS

In drawings which help illustrate the present invention.

In all figures, like reference numerals represent the same or identical components of the present invention.

DETAILED DESCRIPTION OF EMBODIMENTS OF THE INVENTION

Figure 1:
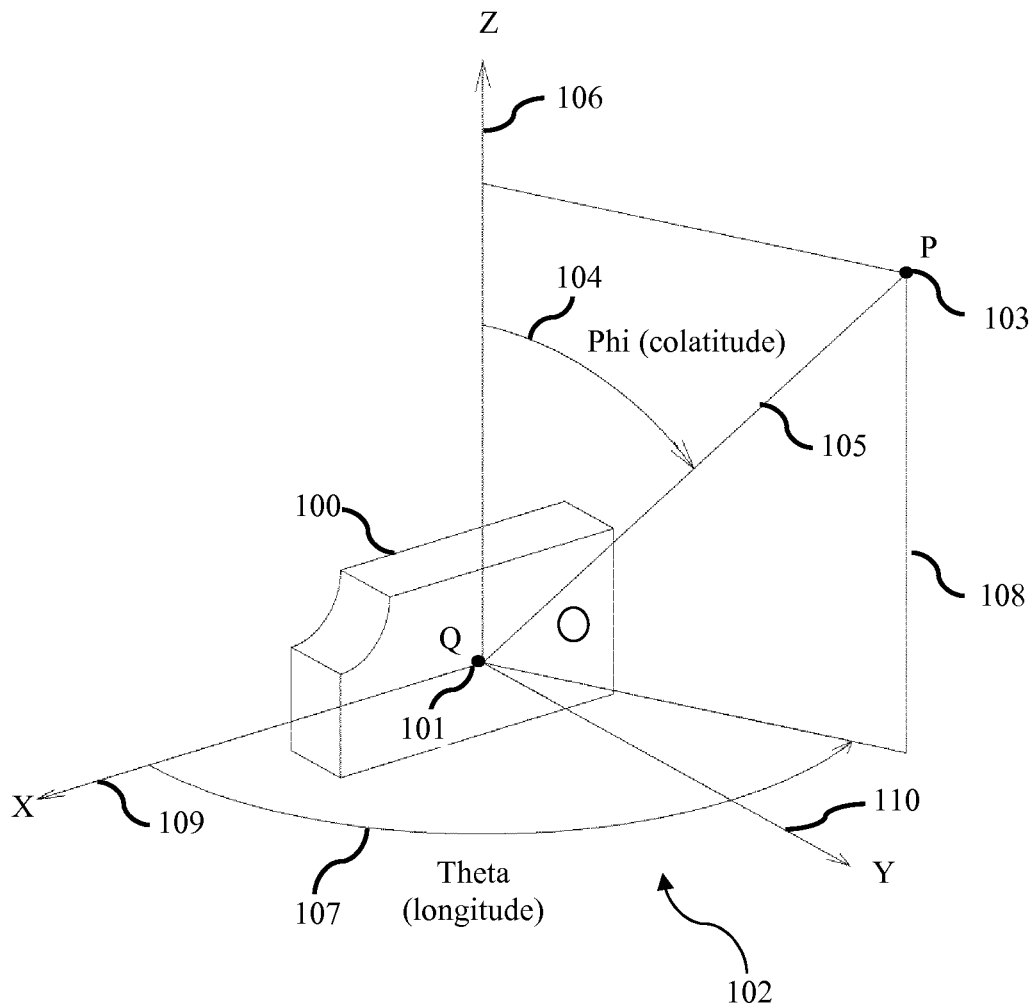
FIG. 1 is an isometric of a subject object in a spherical coordinate system.

FIG. 1 shows a three dimensional subject object 100 at a origin Q 101 of a spherical coordinate system 102 and a point P 103 from which object 100 is viewed. In the system of spherical Coordinates 102 point P 103 in 3-space is represented by an ordered triple (R, Phi, Theta) where R is the distance from P 103 to origin Q 101. An angle Phi 104 is the angle a radial line QP 105 makes with the positive direction of a z-axis 106, and an angle Theta 107 is the angle between a plane 108, containing P 103 and z-axis 106, and an xz-plane containing z-axis 106 and an x-axis 109. For further understanding, the Phi-surfaces (Phi=constant) are circular cones with z-axis 106 as axis; and the Theta-surfaces (Theta=constant) are vertical planes containing z-axis 106. Phi 104 is frequently referred to as the current value of the colatitude coordinate, and Theta 107 is the current value of the longitude coordinate.

Figure 2:
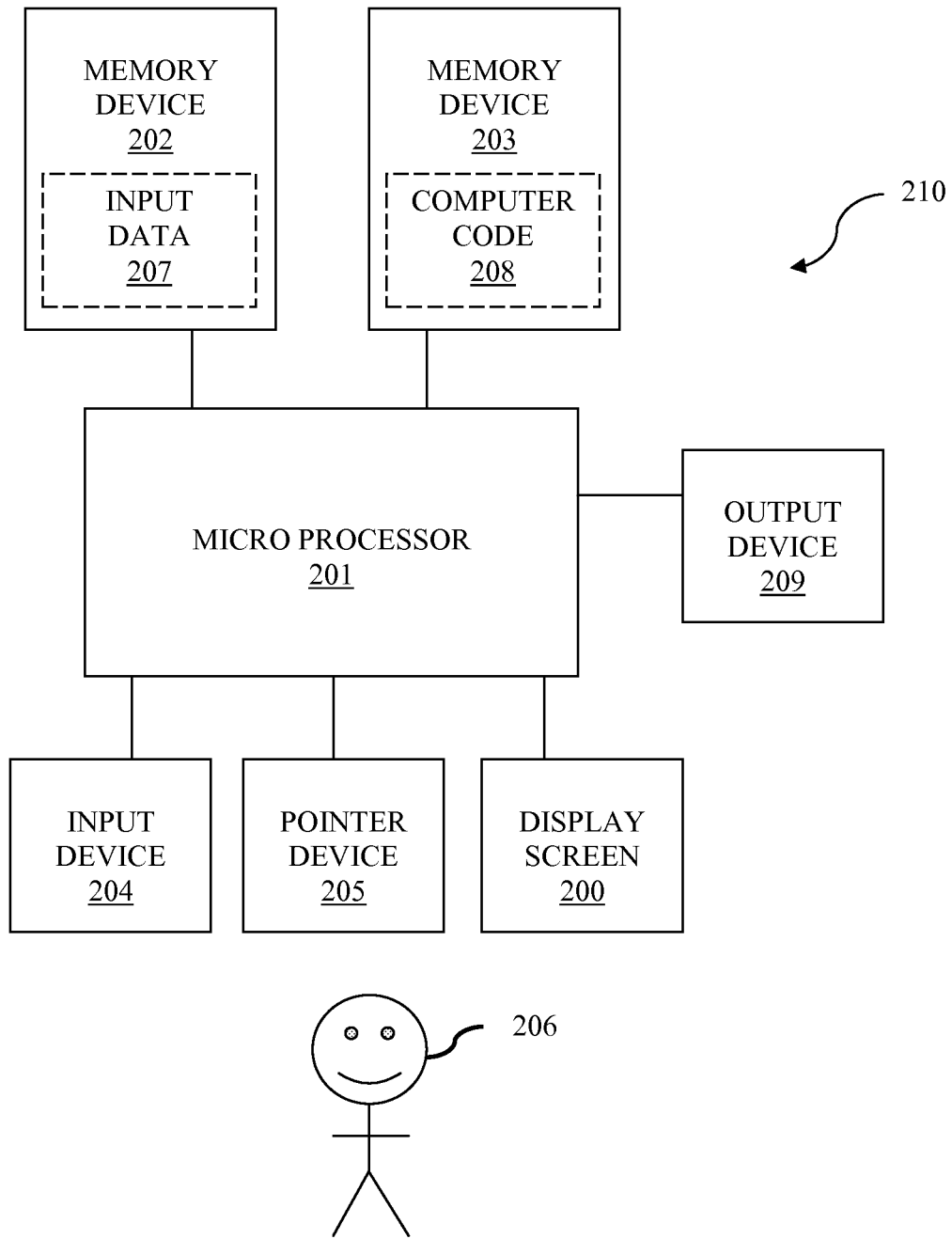
FIG. 2 is a diagram of a typical computer system.

Referring now to FIG. 2, a software application utilizing the present invention would typically run on a computer system such as a server, desktop, laptop, tablet, phone, game console or other electronic devices. The computer system typically comprises a display screen 200, one or more microprocessors 201, a memory devices 202 and 203, an input device 204, an output device 209, and a pointer device 205. A user 206 releasing a mouse button to complete a drag is equivalent to removing a stylus from a touch screen, and similar actions involving a general pointer device 205.

Figure 3:
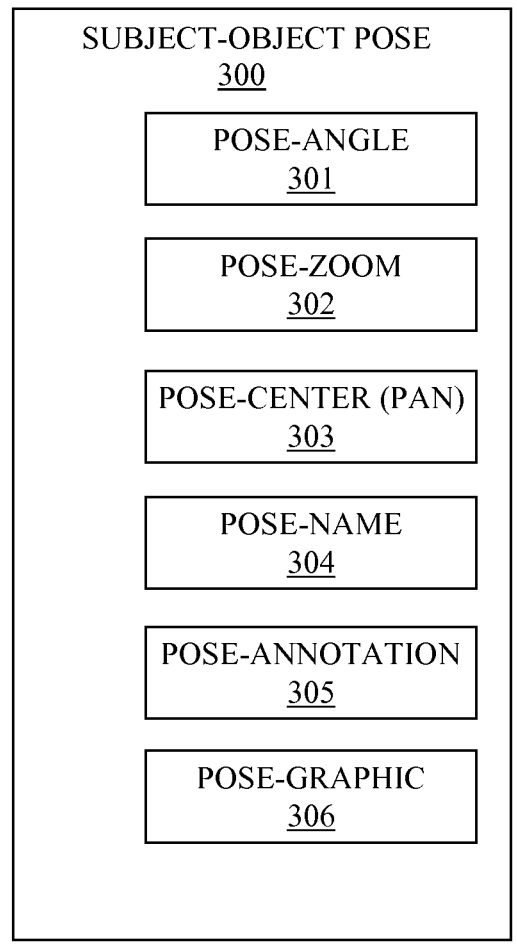
FIG. 3 is a diagram of pose attributes.

FIG. 3 indicates that a pose 300 of subject object 100 comprises a pose-angle 301, a pose-zoom 302, and a pose-center 303. Pose-angle 301 in this example is made up of the angles Phi 104 and Theta 107 from which subject object 100 is viewed or photographed. Pose-zoom 302 controls how large subject object 100 is displayed and if zoomed-in far enough then only a small portion of subject object 100 will be visible on display screen 200. Pose-center 303 is a co-ordinate that is to be centered in a display area and therefore allows a zoomed-in subject object 100 to be panned left/right or up/down to show features that are no longer visible on display screen 200. Other types of coordinate systems in place of spherical coordinate system 102 may be used as well as a combination of multiple coordinate systems. Pose 300 can have an attribute to be used as a reference or handle such as a pose-name 304. Pose 300 can comprise multiple occurrences of additional attributes such as a pose-annotation 305, and a pose-graphic 306.

Figure 4:
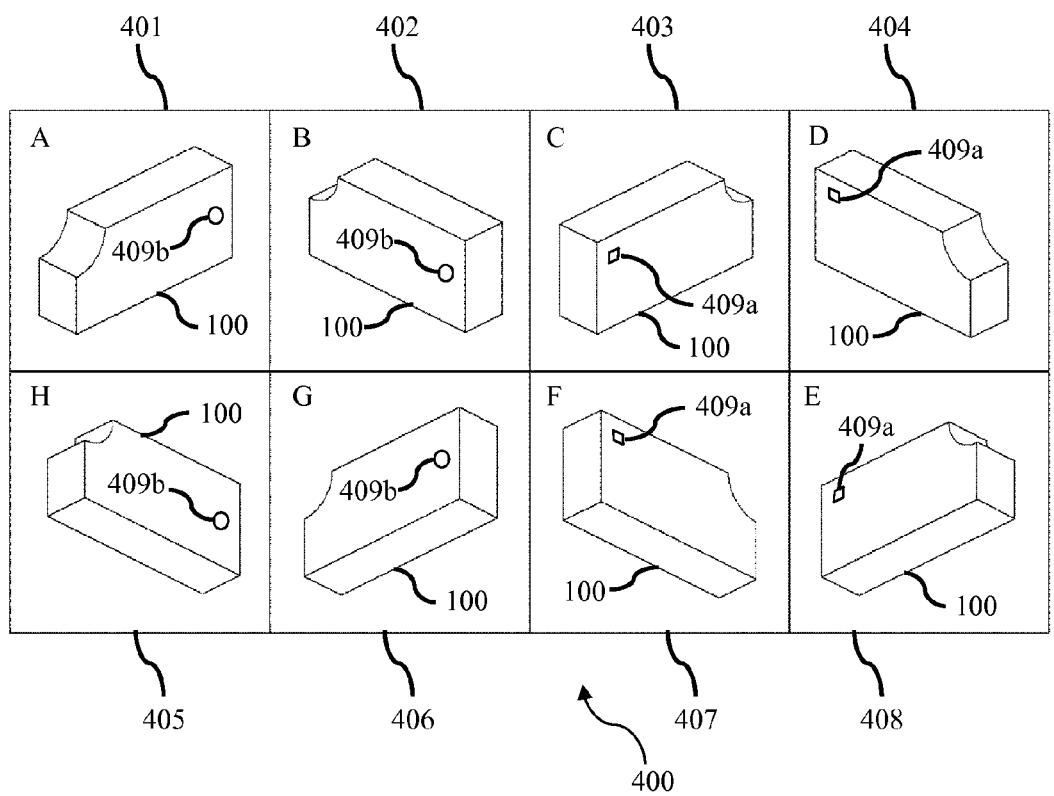
FIG. 4 depicts various poses of subject object at different pose-angles.

FIG. 4 shows a simplified example of a plurality of poses 300 of subject object 100 stored as two-dimensional raster images in a rectangular table 400 form of four columns by two rows. These poses are at the minimum zoom level as seen from the angle from point P 103 to origin Q 101. The top row, A to D, holds Phi 104 constant at 45 degrees and Theta 107 varies such that in pose A 401 Theta=45, in pose B 402 Theta=135, in pose C 403 Theta=225, and in pose D 404 Theta=315 degrees. Similarly, the bottom row, E to H, holds Phi 104 constant at 135 degrees and Theta 107 varies such that in pose H 405 Theta=45, in pose G 406 Theta=135, in pose F 407 Theta=225, and in pose E 408 Theta=315 degrees. Subject object 100 typically has a plurality of physical features 409a, b which could be of interest to user 206.

User 206 actuates pointer device 205 to rotate subject object 100 by dragging within the viewer, which results in sequencing through the poses 300 on display screen 200. User 206 is motivated to rotate subject object 100 so they can see and examine all aspects including the back, top, front, bottom, and sides. In one embodiment of the present invention the poses 300 are photographs taken with a digital commercial grade SLR camera of a real-life physical subject object 100 stored as raster images in sixteen columns by eight rows, with the number of poses increasing as technology becomes faster. Typical subject objects 100 may also be caputered imagery of an animal, plantae, or a movable manufactured physical object, such as a cat, rose, or chair, etc. The photographs may also be in stereoscopic format that communicates depth by providing a slightly different angle to the left eye vs the right eye. In another embodiment of the present invention, the user's computer system calculates and displays a raster image of a pose 300 by rendering a three-dimensional numeric model in substantially real-time.

Figure 5:
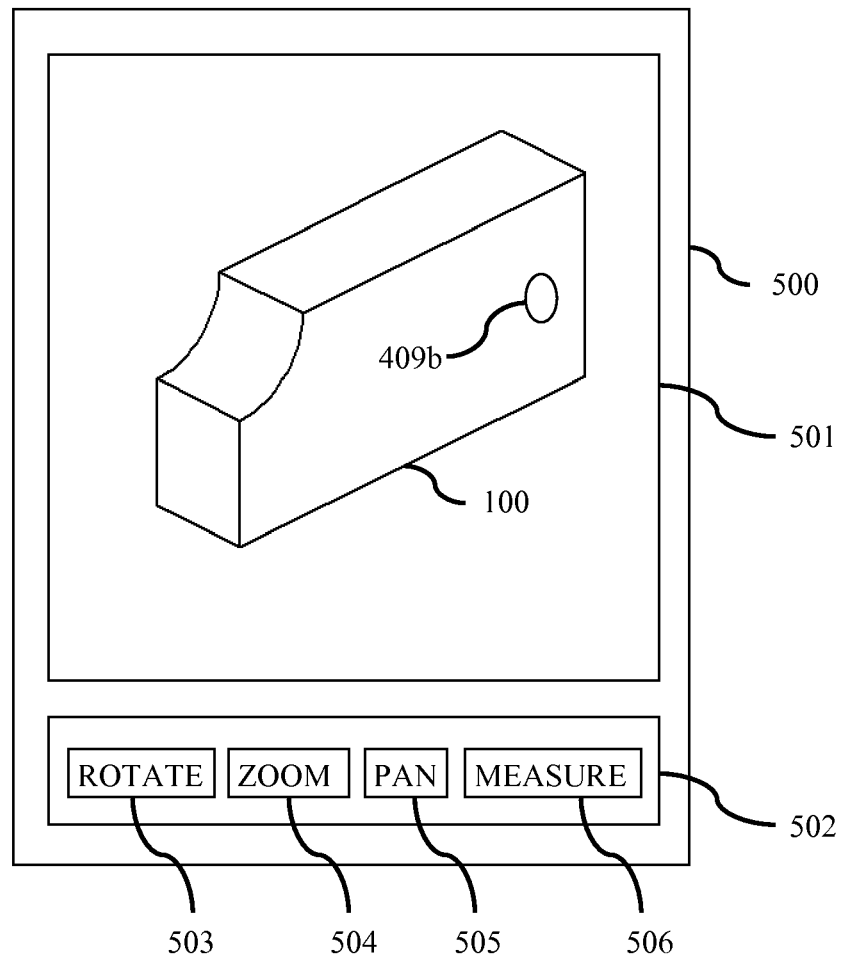
FIG. 5 depicts a viewer with toolbar and displaying subject object.

FIG. 5 shows a multimedia viewer 500 with a display area 501 for displaying subject object 100, and a toolbar 502 having buttons for selecting an operation mode. The toolbar 502 usually comprises a rotate button 503, a zoom button 504, a pan button 505 and a measure button 506. User 206 may use pointer device 205 and click on a particular button 503, 504, 505, 506 to select the desired operation mode. User 206 may then click and drag within display area 501 to change the pose 300 displayed of subject object 100.

Figure 6:
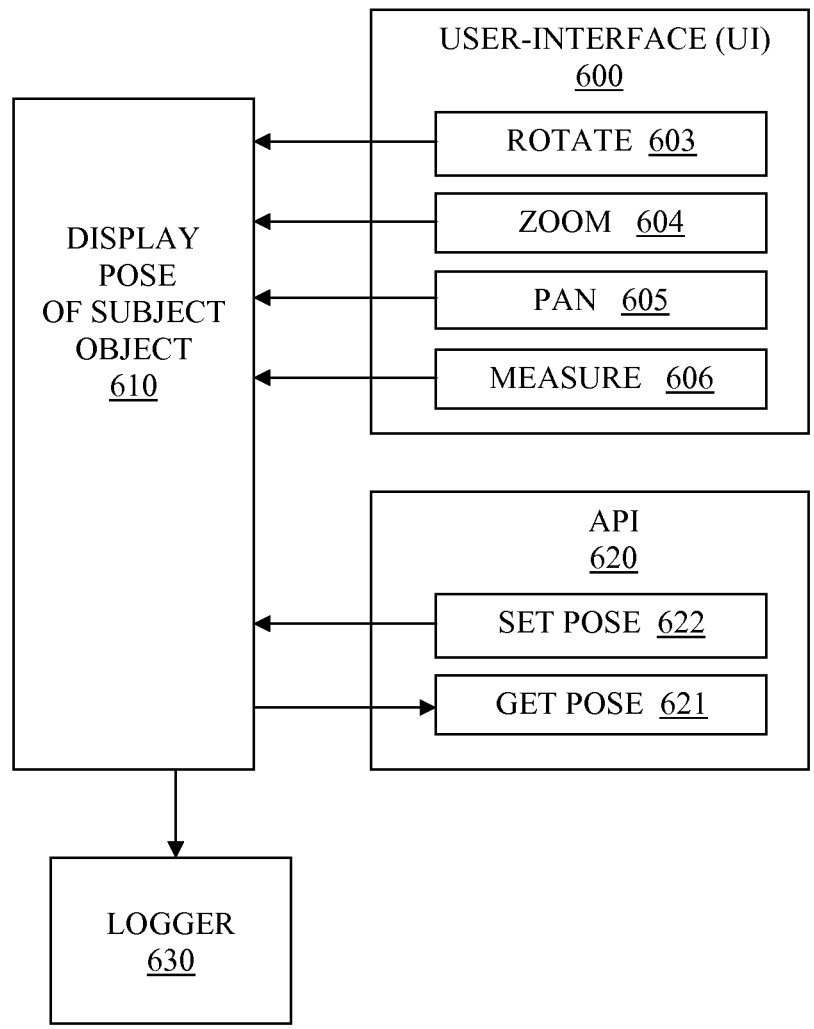
FIG. 6 depicts user-interface and api components of a viewer.

FIG. 6 depicts an example multimedia viewer 500 comprising a display-pose component 610 having functionality for displaying subject object 100 in display area 501 at different poses 300. The example Multimedia viewer 500 also comprises a plurality of User-Interface UI components 600 such as a rotate component 603, a zoom component 604, a pan component 605, and a measure component 606. UI components 600 are associated with their respective toolbar buttons 503, 504, 505, 506 whereby, in one embodiment, user 206 clicks and drags within display area 501 to change various attributes (properties) of pose 300.

Rotate component 603 having functionality for rotating subject object 100 by affecting pose-angle 301 so that display-pose component 610 will show various angles of subject object 100 such as the back side. Typically user 206 press-hold the mouse button and drags horizontally to rotate left and right, or drag vertically to rotate up and down, or drag diagonally to rotate diagonally. Other possible embodiments of rotating may be a slider bar with which user 206 may drag to rotate left and right. Still other ways of rotating may be arrow buttons user 206 may click on to step one pose-angle 301 to the left for each click or similarly to the right, up, or down, by clicking their respective buttons.

Zoom component 604 having functionality for zooming by affecting pose-zoom 302 so that display-pose component 610 will show a larger view of subject object 100 in display area 501 so that additional detail may be seen. Typically user 206 clicks on a zoom-in button or a zoom-out button for one step larger or one step smaller respectively. Alternative ways of zooming are holding the mouse button and drag up or down to dynamically zoom-in or zoom-out. Further alternative ways of zooming are press-release without dragging to zoom-out one step or press-hold the mouse button and drag a box around an area of interest to zoom-in on after releasing. Another possible way of zooming is overlaying a circle containing a magnified portion of subject object 100 where user 206 moves the pointer without holding a mouse button. A combination zoom/rotate tool can then be user 206 holds the mouse button and drags within display area 501 to rotate, and when the mouse button is not held the portion of subject object 100 which is under the pointer is magnified and displayed in a circle overtop of the subject object, in the entire display area 501 completely covering subject object 100, or in an additional display area which is beside the main display area 501.

Pan component 605 having functionality for panning a zoomed-in subject object 100 by affecting pose-center 303 so that display-pose component 610 will show other parts of subject object 100 which are not currently displayed in display area 501. Typically user 206 press-hold a mouse button and drags horizontally or vertically to pan the subject object 100 horizontally or vertically. Other ways of panning may be arrow buttons user 206 may click on to step pose-center 303 toward the left for each click or similarly to the right, up, or down, by clicking their respective buttons.

Measure component 606 having functionality for measuring dimensions of subject object 100 and adding a pose-annotation 305 that display-pose component 610 will show all or part of within display area 501. User 206 can press-hold a mouse button with the pointer overtop of a starting point on the subject object 100 then user 206 drags in any direction to measure the distance between the starting point and the current position of the pointer over the subject object 100. Once the user releases the mouse button a new pose-annotation 305 is created.

In addition, FIG. 6 depicts that multimedia viewer 500 also comprises a plurality of Application Programming Interface API components 620 such as a get-pose component 621 and a set-pose component 622.

Get-pose component 621 having functionality for getting pose attributes of the currently displayed pose 300. As discussed previously, user 206 can manipulate the currently displayed pose 300 in response to using pointer device 205 or input device 204 with user interface components 600 such that a specific feature 409 of subject object 100 is zoomed-in and centered in display area 501.

Set-pose component 622 having functionality for setting the attributes of pose 300 to predetermined values. The Display-pose component 610 then displays subject object 100 at the particular pose 300, including displaying any pose-annotations 305 or a pose-graphics 306. Set-pose component 622 may take additional parameters that control the speed of rotation from the current angle subject object 100 is displayed at to the new predetermined pose 300. Similarly, the speed of zooming and panning may be specified or even a starting direction to begin the rotation so that the user sees an animation of the long way around in contrast to the shortest path. Jumping directly to the predetermined pose 300 without animating in small steps towards it can enable external software or different modules controlling the animation speed or path taken.

Figure 7A:
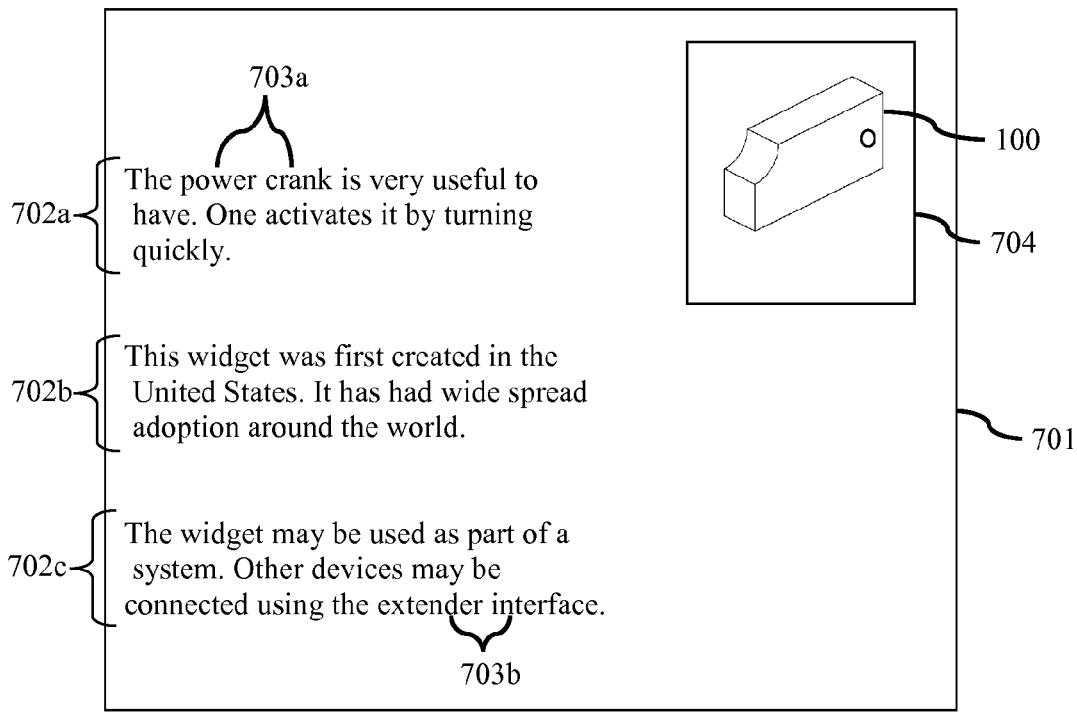
FIG. 7A depicts an example webpage with holder image having specially crafted filename.

FIG. 7A depicts a webpage document 701 comprising one or more paragraphs 702a, b, c and a holder image 704 which shows a raster graphic of one angle of subject object 100. Paragraphs 702 generally describe physical features 409 of subject object 100 with a specific industry terminology 703a, b for example "power crank" 703a and "extender interface" 703b respectively. The paragraphs' 702 messages generally communicate any benefits that result from purchasing subject object 100 or general information about or history of subject object 100. Document 701 is not required to be a webpage within a browser environment; rather document 701 may be part of a special purpose software application, a word processor, a slide show presentation, electronic book, or any application where paragraphs are combined with images.

Figure 8A:
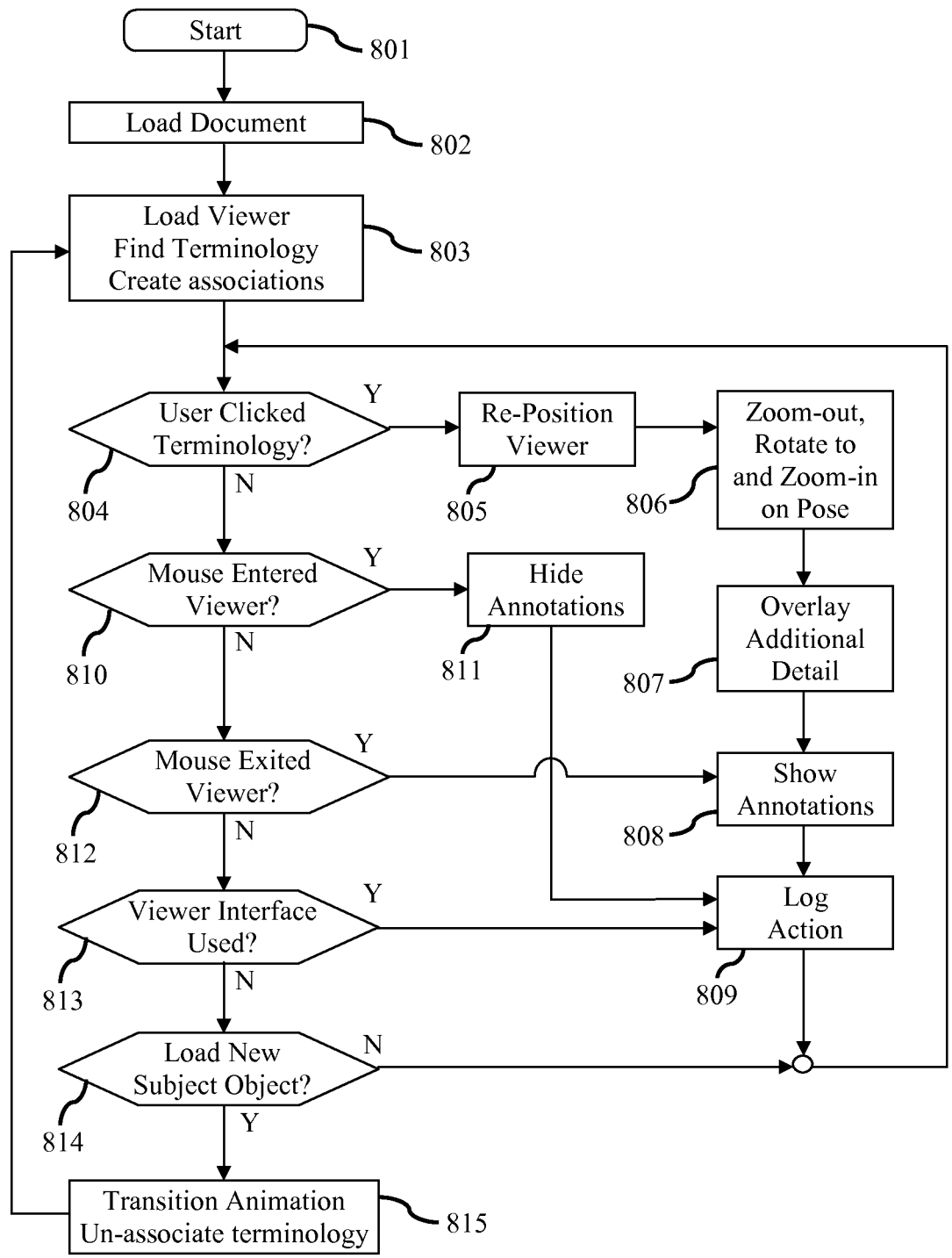
FIG. 8A is a flowchart of loading and interacting with terminology and viewer.

Process Flow Chart FIG. 8A

Figure 7B:
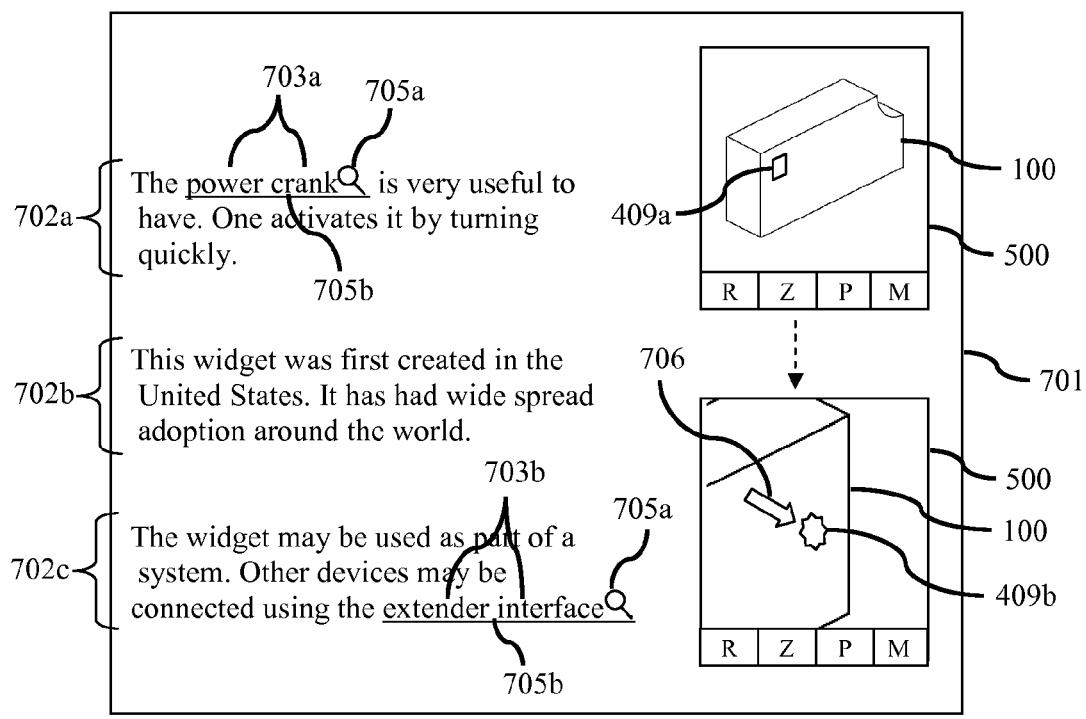
FIG. 7B depicts an example webpage with viewer and associated terminology.
Figures 8B, 9:
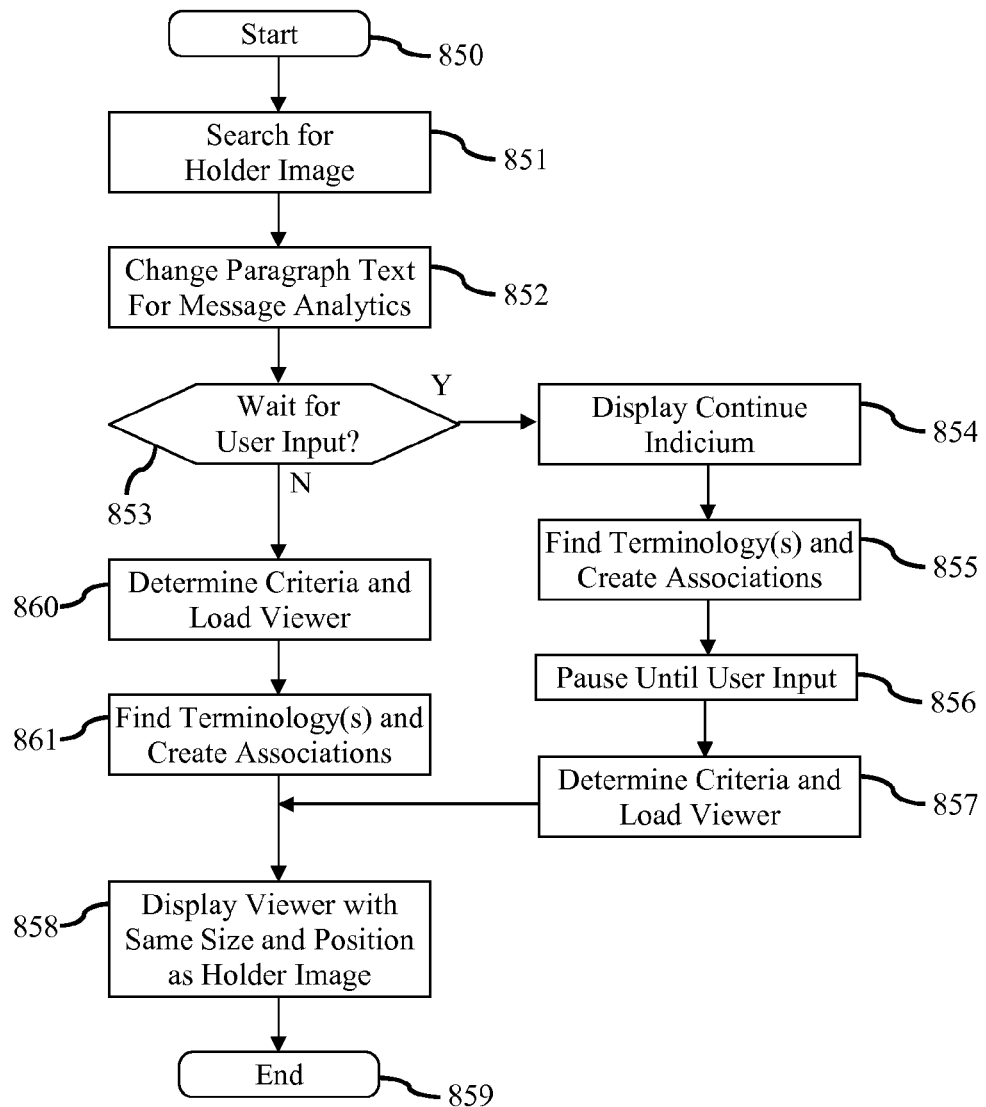
FIG. 8B is a flowchart of replacing a holder image having a specially crafted filename.
FIG. 9 is an example of a specially crafted filename having a predetermined pattern.

In conjunction with FIG. 7B, FIGS. 8A and 8B shows a process that may be used, in one example embodiment, to visually define industry terminology 703 when terminology 703 is clicked by a user who is reading paragraph 702 but is having difficulty understanding its message because they are unfamiliar with the meaning of certain terminology 703.

FIG. 8A shows a basic process in which viewer 500 is determined and loaded, terminology 703 are found and associated with predetermined poses 300, with the result of when terminology 703 are clicked an associated pose 300 is displayed in viewer 500, and user interactions are logged for synchronization and/or storing and/or transmitting viewer analytics data for reporting viewer analytics information.

The process begins in step 801 when a new document 701, such as a webpage, is requested by an application, such as a browser, from an HTTP server. In step 802, document 701, including the graphical image within holder image 704, are loaded from a first server. In step 803, multimedia viewer 500 is loaded from a second server and displayed overtop of holder image 704. The industry terminology 703 are associated with their respective predetermined poses 300 by way of a document event, such as onClick( ) or onMouseOver( ), that is configured to invoke set-pose component 622 with a predetermined pose 300. For example, terminology 703a "power crank" is associated with pose 403 that has a rotation angle and zoom level which reveals the square physical feature 409a. Similarly, terminology 703b "extender interface" is associated with a modified pose 401 that has a rotation angle and zoom level which reveals the circular physical feature 409b. FIG. 7B shows the resulting display of document 701 after terminology 703 have been associated, and viewer 500 has been loaded and displayed in place of holder image 704 near the upper right corner. In this example, associating comprises displaying indicium 705 which communicates to user 206 that additional explanation will be revealed if it is clicked or rolled over. The indicium 705 for example can be any communication means such as: a magnifying glass 705a; an underline 705b; a changing pointer style/graphic; a color that is different from the rest of the text in the paragraph 702; and is generally in combination with terminology 703 where user 206 may click on any one of these. Indicium 705 includes the terminology 703 or may be as simple as a letter that represents a reference to a feature 409 such as tab "B" or answer "B" for a multiple choice question. In some embodiments, step 803 is replaced with the more complex process of FIG. 8B, discussed further below, which illustrates an example of determining a version of viewer 500 and waiting for a user input before loading.

In step 804, a determination is made as to if one of associated terminology 703 has received user input with a click or mouse-over by user 206. For example, user 206 can now read a paragraph 702 of information presented on a webpage and when they come across terminology 703 that they are not familiar with they can click on the terminology 703 to see what it looks like.

Viewer Re-Location

If, in step 804, an associated terminology 703 has been clicked, then in step 805, viewer 500 is repositioned within document 701 so that it is aligned with, or nearer to (in closer proximity to) the clicked terminology 703. For example, when user 206 comes across terminology 703 farther down on the page and they click the terminology 703b "extender interface" to see what it looks like, viewer 500 dynamically re-positions further down the page (see viewer 500 near bottom right of FIG. 7B) so it becomes visible to user 206 before it rotates and zooms-in to the pose 300 (including pose-annotation 305 as arrow 706) associated with the "extender interface" terminology 703b clicked. This reposition, or re-location, can be described as floating down the page and generally lining up to be in a similar vertical position with the terminology 703. The horizontal position may also be relative with the terminology 703 or absolutely positioned relative to the left or right side of the screen, or various regions in the document such as a distance relative to the right side of a paragraph, or relative to the starting position of the holding image 704. A hide button is provided on which user 206 may click to cause viewer 500 to dynamically re-located back up to the original holder image 704 position.

Display Pose for Terminology

In step 806, viewer 500 displays the predetermined pose 300 which is associated with the particular terminology 703 clicked, resulting in user 206 seeing exactly what the particular terminology 703 looks like. In some embodiments, user 206 is communicated (shown) the location and orientation of the feature 409 that the terminology 703 is associated with because viewer 500 first slowly and dynamically zooms-out so the entire subject object 100 is visible and then slowly rotates to the correct angle and then the viewer 500 slowly zooms-in on the particular feature 409. The gradual dynamic movement communicates to user 206 that they are now looking at a feature 409a on the back of subject object 100 in contrast to a similar feature on the front. If the predetermined pose 300 is already displayed from a previous click of the terminology 703, then to better communicate orientation the viewer 500 zooms-out and rotates subject object 100 three hundred and sixty degrees then zooms-in, in contrast to the typical action of rotating the shortest path to the associated pose-angle 301.

Overlay Additional Detail

In step 807, viewer 500 overlays a pose's 300 pose-graphic 306 of additional detail on top of subject object 100. The additional detail graphic is a raster image generally comprised of either higher resolution, or a different technique of imaging, etc. For example, an additional detail graphic may be higher resolution pixel data for only a local area around a feature 409 of subject object 100. In an example of user 206 clicking on the terminology "propeller nuts" which causes a tanker ship to be orientated (rotated) to a predetermined pose 300 that shows the stern, then zooms-in on the propeller at which point a new image is loaded that has high enough resolution and detail to show the flats of the nuts. In one embodiment, only the small region containing the propeller has the extra high resolution pixels and so panning outside of this region provides the standard lower pixel resolution typically displayed when the viewer 500 user-interface 600 is utilized. For example in FIG. 7B see arrow 706 pointing to additional detail now visible of the "extender interface" feature 409b that previously looked like a circle. Loaded in or loading in means retrieved from non-transient storage such as from certain forms of memory device 203 or from a network or internet storage or HTTP server.

Alternate Imaging Mode Overlay

Overlaying additional detail graphic may also be used to mix different imaging techniques, such as photographic techniques, wavelengths, sensing types, renderings, cartoons, paintings, post processing algorithms, etc. For example, tanker-ship images displayed using the user-interface 600 are previous renderings of a very large and complex 3D numeric model; where these renderings were previously calculated and stored as raster images so that very long rendering times such as ten minutes or ten hours can be computed to provide very realistic high quality. Now when user 206 is reading a paragraph on how to lower a life boat and clicks on terminology 703 such as "rope clamp", then the 3D rendered tanker-ship is rotated and zoomed-in on a lifeboat, then the alternate imaging mode of a real photograph of a real lifeboat on a real ship is loaded and displayed over the equivalent 3D rendered area. This enables that only certain features of the tanker-ship need to be photographed, in contrast to a photographer in a helicopter taking pictures from two hundred and forty different angles; and these photographs would not have enough pixels to show the level of detail required to reveal the rope clamp which needs to be released to allow the lifeboat to be lowered. The alternate imaging modes may be created by many different methods, a few examples are, but not limited to, scanning electron microscopes, photographs with a IR Infra Red filter attached to the lens, or hand drawn pictures or cartoons. Other embodiments of the present invention may overlay an animation or video that more particularly points out feature 409, such as a silhouette of a person pointing to feature 409 or moving annotations 305, the video may contain audio to assist in the communication or audio only is presented to user 206.

Annotations

In step 808, pose-annotations 305 are displayed overtop of subject object 100 to more particularly point out which feature 409 the clicked terminology 703 describes. A number of different annotations 305 can be overlaid, such as but not limited to, an arrow 706 pointing to a feature, a dimension to indicate size, highlighted peanut shaped regions of a semi-transparent color, text, circles, squares, or other geometric shapes, or graphics, etc. A blur filter can also be effective where the feature of interest is in focus and all other parts of subject object 100 are made blurry. Annotations 305 may be used to communicate additional information such as instructions that assist the assembly of a new product. Annotations 305 may also be a means to receive input where clicking an annotation circle or mouse-over it can result in additional information presented in a pop-up box, or can be configured as a means of indicating the user's 206 answer to a question, or causing a new subject object 100 to be loaded. For example clicking a circle annotation 305 near a cover's latch can cause viewer 500 to load in a new subject object 100 which has its cover removed.

Logging User Interactions

In step 809, user's 206 interaction of clicking on associated terminology 703 is logged 630, stored and/or transmitted to a viewer analytics server. Examples of other interactions (actions, activities) logged are using the viewer 500 user-interface 600 directly where user 206 can rotate 603 subject object 100, zoom-in 604 on a feature of interest, take measurements 606, click annotations 305, etc. The time of the interaction is also stored along with an ID that identifies user 206, document 701 name, subject object 100 identifier, and/or other information such as the speed of rotation, or the pose-name 304 associated with clicked terminology 703. The logged 630 interactions (viewer analytics data) can be uploaded to a viewer analytics server immediately, periodically, such as every five seconds, or uploaded at the time that document 701 is unloaded from the browser. See analytics sections below for additional detail.

After the logging of step 809, the process jumps back to step 804 to determine if other associated terminology 703 have been clicked, if none have then the process continues to step 810.

Hiding Annotations

Steps 810 and 812 determine if the mouse pointer enters or exits the viewer 500 area. If it enters then the process jumps to step 811 where any displayed pose-annotations 305 are hidden so that subject object 100 is clearly seen, then continues to step 809 to log the interaction. Alternately in step 812, if user 206 moves the mouse to exit the viewer 500 area then the process jumps to step 808 to display the pose-annotations 305 once again. For example, user 206 can easily turn the annotations or alternate detail images of pose-graphic 306 on and off, such as an arrow 706 annotation that is overlaid to point out a feature may be obscuring a different part of the subject object 100. A toggle button can be clicked or user 206 can move the mouse pointer to enter the viewer 500 area (region) to hide pose-annotations 305 and/or pose-graphic 306 and then move the mouse pointer to exit the viewer 500 area (region) to show the annotations again, or vice-versa. In one embodiment, user actions may be: hiding the annotations 305 when the pointer is in motion within viewer 500 area; and showing the annotation again when the pointer stops moving, or when the pointer pauses motion for a short period of time like half a second. Alternatively, annotations are hidden when mouse button is pressed anywhere in viewer 500 area, and annotations are shown again when mouse button is released. The hide annotation technique is advantageous in the example where subject object 100 can not be rotated such as one photograph of a painting taken from only one angle; where user 206 can click on an associated terminology 703 "first finger print" and viewer 500 will zoom-in on the area of the painting with the finger print, then display a circle around it, an arrow 706, lines representing the ridges of the print, or the ridges colorized yellow. Upon moving the pointer into the viewer 500 area the original painting is shown without the overlaid pose-annotation 305 or pose-graphic 306 effects.

Viewer Interface Used

If the determinations of steps 804, 810, and 812 are all "no", then step 813 determines if the viewer 500 user-interface 600 has been used. If it has then the process jumps to step 809 where user 206 interaction with viewer 500 is logged as discussed above. Otherwise the process continues to step 814.

Load New Subject Object

Step 814 determines if viewer 500 should load a new subject object 100, yes will continue to step 815 where any previously associated terminology 703 are un-associated and then jump back to step 803 where terminology 703 associated with the new subject object 100 is found and associated along with loading the new viewer 500 and subject object 100 data. In an example embodiment of the present invention, user 206 clicks on associated terminology 703 that causes viewer 500 to first rotate to a similar pose 300 that the new subject object 100 will initially be shown. Then viewer 500 displays a transitional animation if the new subject object 100 is just a different configuration of the original subject object 100, such as a music box with a cover closed and a music box with a cover open, where user 206 will see the animation of the cover slowly opening while the new subject object 100 is loading.

In other embodiments of the present invention, a sophisticated video or audio file may contain triggers at predetermined times or chapters of playback, where an actor in the video may be discussing a particular feature 409 of subject object 100, at which point the multimedia player invokes viewer's 500 set-pose 622 API 620 which results in subject object 100 being rotated and zoomed in to a pose 300 that is associated with the particular part of the audio or video material.

Process Flowchart FIG. 8B

Detect Viewer Holder Image

The FIG. 8A process includes step 803 where viewer 500 is loaded and terminology 703 is associated with poses 300, and FIG. 8B depicts an exemplary process flow that replaces step 803 with additional functionality. Step 851, detects a holder image 704 (or region) by searching the loaded document 701 of step 802 for a predetermined pattern 901 of characters (FIG. 9), which indicate that a particular image in document 701 is intended to be occupied by viewer 500 (or general multi-media player) by overlay or replacement. Then step 851 extracts a data file-name 904 for subject object 100 from characters within holder image's 704 filename. One example embodiment searches the DOM for all document's 701 image tags "<img" and related src values for predetermined pattern 901, such as "_3dr_", as found in the example illustrated in FIG. 9 such as <img src=site1.com/r0005_3dr_widget.jpg?key=123 width=300 height=200/>. In this example the image file r0005_3dr_widget.jpg is a standard raster image with JPG compression, which is hosted by a first server 903 named "site1.com", and is generally initially displayed by the browser along with document 701. The particular subject object 100 data to load is indicated just before predetermined pattern 901 "_3dr_" and/or until another special character is found, such as "r" in this example, therefore subject object 100 data file-name 904 is determined in part from "r0005". Alternatively, extracting data file-name 904 can be to the right of predetermined pattern 901, or anywhere in the src string such as after the ".JPG" and following a "?" character. The advantage of following the "?" character is a plurality of additional parameters 902 can be passed from the client side browser to viewer 500 on the client side, such as a password "key=123" and/or starting angle, without having to rename or have multiple copies of the viewer holder image 704 filename stored on first server 903. The size of viewer 500 is determined by detecting the width and height within holder image 704 data or searching for <img tag "width=" or "height=" attributes. The position of viewer 500 is determined by detecting the layout position of viewer holder image 704 within document 701 using standard DOM functions. Other embodiments can have predetermined pattern 901 or data filename 904 indicated in a tag attribute other than "src=" such as "alt=" or "title=" or "custom=". It is also not required to use the "<img" tag, any html/xml tag can be used as position and size holder for viewer 500 such as "<div" or "<span". Another embodiment of the present invention, using a viewer holder image 704 in conjunction with client side script that searches for a predetermined pattern 901, can be used to load any multimedia player, including videos, and has the advantage that the author of the website document only needs to know how to upload and insert images having specially crafted file names, instead of using the more complex "<script", "<applet", "<object" or "<embed" tags typically required to show a video.

In one embodiment of the present invention, step 851 can search each image within document 701 for property attributes contained within the actual compressed JPG data file. Normally the image decoder within the browser would ignore the standard image properties, such as author, keywords, or comments, however step 851 can search them for predetermined pattern 901, or search for the existence of a custom property "3dr_subject_object_name" where its value is in part the name of the subject object 100, such as in the previous example "r0005". The predetermined pattern 901 may be found in a folder name within the path of holder image 704, such as src="site1.com/viewer_3dr_images/r0005.jpg", or appearing as a double extension such as src="r0005.3dr.jpg". Other properties can indicate the server address from which the viewer 500 and subject object 100 data should be loaded, for example an alternate server called "site2.com". Further additional properties can indicate the viewer version to be used or indicate the multimedia type is video or even a specific browser plug-in name such as "videoplayer1". Consider the prior art example of embedding a video hosted on a second server through inserting, into document 701, a script snippet such as <script src=site2.com/videojs?name=r0005></script>. In contrast, utilizing the present invention, user 206 need only be provided with a specially crafted raster image to insert into document 701 as holder image 704, where a browser will initially display the raster image within document 701. Subsequently, holder image 704 will eventually be obscured by viewer 500 of the same size and position as will be discussed further below. Holder image 704 may be hosted by first server 903 "site1.com" (which also hosts document 701) or second server "site2.com"; viewer 500 may be hosted by the same server as holder image 704 or viewer 500 may be hosted by a different server address specified in a property attribute within the raster image data file or a server address specified in a script variable. For example document http://site1.com/document.html includes a first holder image <img src=site1.com/r0005_3dr_widgetjpg?server=site2.com/> and a second holder image <img src=site2.com/r0005_3dr_widget.jpg/> where both holder image 704 filenames are indicating viewer 500 subject object 100 data is hosted on "site2.com" by the two different methods, however the first holder image 704 is hosted site1.com and the second holder image 704 is hosted on site2.com, the latter has the advantage of not requiring to have been first uploaded to server site1.com (document server) by the document author.

Change Paragraph Text for Message Ranking Analytics

The FIG. 8B process then moves to step 852 where data filename 904 and/or additional parameters 902 can be used to retrieve replacement text (message) for one or more paragraphs 702 in document 701. The replacement text can be retrieved from a second server, first server 903, or can be a hidden block within document 701 which is now shown as another block is hidden. The replacement text version can be randomized or in a sequence and remembered for each user 206 or randomized each time a particular user 206 browses document 701. As user 206 interacts with viewer 500 user interface 600 or associated terminology 703, the process of FIG. 8A logs those interactions in step 809 in addition to the version of replacement text (message). Analysis of an increase in user 206 interaction for a specific version of replacement text ranks the effectiveness of the message wording within the replacement text. Direct ranking comparisons can be made between different versions of replacement text. See Message analytics section below for additional detail.

Load from Different Server

Not just the replacement text can be retrieved from a second server. Some embodiments may have the multimedia viewer 500 and subject object 100 data be hosted on a second server that is different from first server 903 which hosts document 701 and viewer holder image 704 file. Similarly, the part of data which associates terminology 703 to its respective predetermined pose 300, can be hosted on the second server or hosted on first server 903 or a third server. The advantage of having holder image 704 file on first server 901 is the document 701 is meaningful and usable by user 206 to make an ecommerce purchase even if the second server is temporarily unavailable to provide viewer 500 code and subject object 100 data.

Wait for User Action Before Loading Viewer

Following step 852, step 853 determines if the process should wait for an action (user input) by user 206 before viewer 500 is loaded and displayed. One advantage is the amount of data served is reduced because not every user 206 will want to interact with viewer 500. If step 853, the document author or user 206 preference indicates to wait for user action, then the process branches to step 854, otherwise the process branches to step 860.

Display Continue Indicium

Step 854 displays or overlays an indicium such as a graphic or text that communicates to user 206 that clicking on holder image 704 will load in viewer 500 so that user 206 may interact with it. In one embodiment, the indicium is a raster image of viewer 500 toolbar buttons of user-interface 502 overlaid on top of holder image 704 so that it appears to be a full functioning viewer 500, however the main viewer 500 code and subject object 100 data is only loaded after the first click by user 206. Other embodiments have indicium such as a trademark, text, or some other means to indicate holder image 704 is more than just a static JPG image. In one embodiment, a whole new holder image 704 already comprising the indicium can be loaded from the document 701 server or the viewer 500 server. The process continues to step 855.

Search for Terminology and Associate with Predetermined Pose

Step 855 searches document 701 for terminology 703 which has an associated pose 300 of subject object 100. When terminology 703 is found then an event handler such as OnClick( ) or OnMouseOver( ) is applied and configured so that viewer 500 will display the associated predetermined pose 300 of subject object 100. The event handler also determines that, if viewer 500 and subject object 100 data are not yet loaded then they are loaded followed by showing the associated pose 300. To apply an OnClick event handler by client-side script, terminology 703 in document 701 is replaced with the same terminology surrounded by "<span" tags to create the association. In addition, an indicium, such as a magnifying glass, can be placed at the beginning or end of terminology 703 to communicate with user 206 that clicking on terminology 703 will cause viewer 500 to help visually define what terminology 703 means. In some embodiments, document 701 will already have terminology 703 surrounded by "<span" tags with an "id=posename" associated with a pose, in this case, only altering the style properties of the span can reveal an indicium, and an event handler can be added to the span element/instance to create the association. The terminology-pose data can be retrieved from the server hosting document 701 or a different server hosting subject object 100 data or a third server. In an embodiment where document 701 has multiple occurrences of a specific terminology 703, then an extra parameter is used which indicates all occurrences of terminology 703 should be associated with the predetermined pose 300, or only one occurrence by integer, or multiple occurrences by a list of integers. In another embodiment, a longer phrase containing terminology 703 is found and associated, where the terminology 703 index position from the start of the longer phrase is used or the terminology 703 is searched for within the longer phrase. This is explained further in the "Associating a terminology to a pose" section below. The process continues to step 856.

Wait for User Interaction then Load Viewer

Step 856 pauses the process until user 206 clicks on associated terminology 703 or holder image 704. Generally, clicking can be described as interacting with, or selecting, or by other user input action, such as but limited to a mouse pointer, finger, input device, stylus, touch screen, keyboard, clicking, double clicking, press and hold, etc.

In step 857 viewer 500 code is retrieved from the same first server as the document 701 or a second server. The specific version of viewer 500 code to load is determined by a number of criteria comprising: browser type; plug-in or program language available such as Flash or Java or HTML5; screen size such as desktop or smart phone; available memory; parameters for viewer 500 user-interface 502 toolbar composition such as rotate, zoom, pan, measure, help, or a subset of these or alternate tools that do not require dragging just clicking to rotate or zoom a small step. The viewer 500 code may be programmed in various languages such as Flash, Java, Javascript, or a custom browser plug-in. The version of subject object 100 data to load may also use similar criteria above; the different subject object 100 data versions comprise such things as different number of angles available, maximum resolution, smaller files for lower bandwidth speeds or higher cost of traffic. The process continues to step 858.

Display Viewer in Place of Holding Image, with Advertizing

In step 858, viewer 500 is displayed overtop of holder image 704, and because viewer 500 has substantially the same size and position (as determined in step 851), holder image 704 is now completely hidden behind viewer 500.

Some embodiments can have viewer 500 initially be positioned in the document so that it is out of sight of user 206, such as beyond the left margin of the browser, and once fully loaded then viewer 500 slowly and dynamically repositions across the display screen a small step at a time to finally stop overtop of viewer holder image 704.

An advertisement is displayed overtop of viewer holder image 704 for a period of time, such as five seconds, before viewer 500 occupies that position; Typically while viewer 500 code and subject object 100 data are being retrieved from a server and any additional time desired. Because viewer 500 eventually obscures the advertisement, a button or text is provided that user 206 can click to see the advertisement information again or click through to the advertiser's website. The advertisement can be made up of such things as text, images, animation, or video, etc. In some embodiments the advertisement is displayed by viewer 500 code before subject object 100 and toolbar 502 buttons are shown to user 206.

In one embodiment, viewer 500 replaces holder image 704 in the Document Object Model (DOM), in contrast to being positioned overtop of holder image 704 using an appropriate z-index value and absolute (or relative) positioning as discusses above. Similarly, an alternate image can replace holder image 704 in the DOM followed by viewer 500 being positioned overtop of the alternate image. The alternate image can be an advertisement, message, or a particular angle of subject object 100, etc.

The process now continues to step 859 which is to end this process of FIG. 8B, and continue to step 804 of the process shown in FIG. 8A.

If however back in step 853, of the FIG. 8B process, determines that the process should not wait for an action by user 206 before viewer 500 is loaded and displayed, then the process jumps to step 860.

In step 860, the same tasks found in step 857 are performed to determine the version of viewer 500 to load and to start retrieving it and subject object 100 data from a server. Then the process continues to step 861.

In step 861, the same tasks listed in step 855 are performed, for example, event handler such as OnClick( ) or OnMouseOver( ) is applied and configured so that viewer 500 will display the associated predetermined pose 300 of subject object 100. Other embodiments can have step 861 tasks occur before step 860. Then the process continues to step 858 to display viewer 500 as already discussed above.

Advertizing/Subscription to Receive Extra Data or Detail

As disclosed above, an advertisement can be displayed overtop of holder image 704 for a period of time, such as five seconds, before viewer 500 occupies that position; Typically while viewer 500 code and subject object 100 data are being retrieved from a server and any additional time desired. Alternatively, an advertisement can be shown only when user 206 clicks a "more detail" button on the viewer 500 which causes the viewer 500 code to load in additional subject object 100 data, such as twice as many angles from which the user can rotate the subject object 100 by utilizing the user-interface 600. These additional angles will make the rotation of the subject object 100 smoother. And/or the additional subject object 100 data can be higher than normal resolution so that the user may zoom-in further than otherwise possible. And/or the additional subject object 100 data can be a more accurate measurement tool such as, during dragging providing measure readings in steps of 0.1, 0.2, 0.3 inches in contrast to a less accurate 1, 2, 3 inches. If the "more detail" button is not clicked, then user 206 can rotate and interact with the lower quality subject object 100 data in viewer 500 without being exposed to advertising. Instead of showing user 206 advertizing, user 206 can purchase a subscription for one specific website, or a subscription for one or more or all subject objects 100 on one or more or all possible websites. In one embodiment, a subscription is based on a maximum number of viewings of subject objects included in the fee, user 206 is given the option to always load "more detail" by default or be configured to save the subscription count by requiring clicking "more detail" each time.

Associating a Terminology to a Pose

Figure 10:
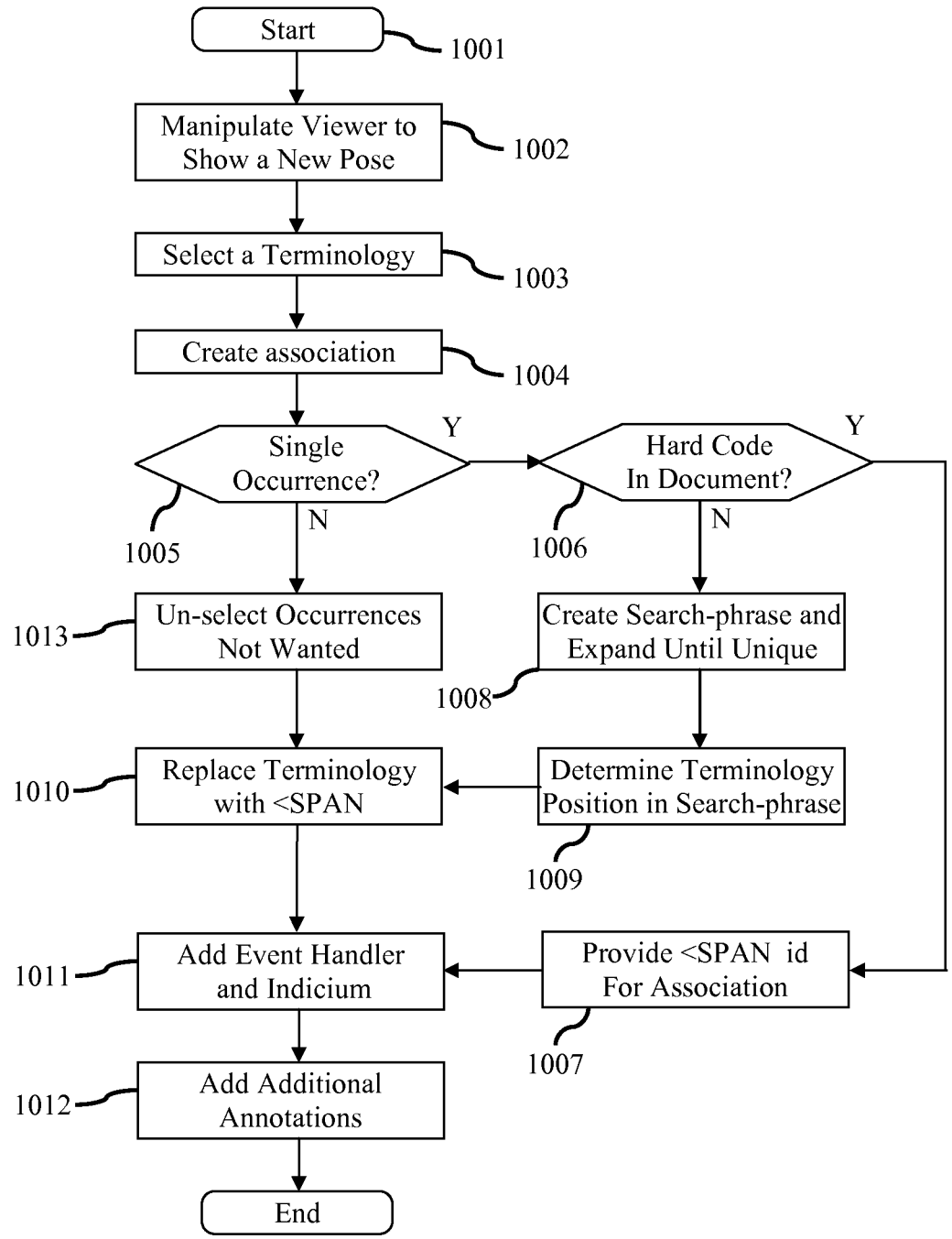
FIG. 10 is a flowchart of creating a new association between terminology and a pose.

FIG. 10 shows a process that may be used, in one example embodiment, to make an association between an industry terminology 703 and a predetermined pose 300 of subject object 100. The process begins in step 1001 when user 206 intends to visually define a terminology 703 within a paragraph 702 to further other users' understanding of the message. User 206 can enter an editing mode, by clicking a viewer 500 button or a button in document 701, where a popup dialog box provides extra buttons and functionality to create terminology 703 associations. Then in step 1002 user 206 manipulates viewer 500 user-interface 600 to display a new pose 300 of subject object 100. New pose 300 displays subject object 100 at a particular zoom, and pan to best show a particular feature 409; and may also comprise annotations such as a measurement dimension, arrow, and/or a particular angle if subject object 100 is rotatable.

Then in step 1003 user 206 selects terminology 703 within document 701. For example, user 206 may tap between words, and drag the stylus across a portion of paragraph 702 to select a single word or a short phrase to be defined as the terminology 703. The portion over which user 206 dragged the stylus may be highlighted by a selection area. Alternatively, user 206 might use a mouse to double-click on a word to select it. A graphic, such as a small thumbnail of subject object 100, in document 701 may also be associated with a predetermined pose 300 whereby clicking the graphic cause's viewer 500 to display the predetermined pose 300 or load a new subject object 100. Selecting of terminology 703 can be performed before manipulating viewer 500 to display the new pose 300.

Then in step 1004 responsive to a user input action, an association is created between the selected terminology 703 and the current new pose 300 of subject object 100 displayed in viewer 500. The user input action for creating the association can be clicking on a store button within viewer 500, a button within the popup dialog box, a button within document 701, or right clicking the selection to access a popup menu to click such things as "save pose" or "store pose", etc. In one embodiment of the present invention, the user input action of selecting a terminology immediately creates the association with the current pose 300 of subject object 100 in viewer 500 where no other user input is required to create the association. For example a user can first rotate and zoom-in on a feature of the subject object 100 and then press-and-drag the mouse pointer across the terminology and release to create the association.

Then in step 1005 user 206 indicates if the selected terminology 703 is to be a single occurrence within document 701, all occurrences that can be found of the selected word or phrase in this specific document 701, or all occurrences across multiple other documents 701 that viewer 500 and subject object 100 may be inserted in the future. If user 206 indicates single occurrence then the process branches to step 1006 where a determination is made if the association should be hard coded in document 701. If "Yes" then the process branches to step 1007 where user 206 is provided with an html snippet of <span id=a class=b>terminology</span> tags surrounding the selected terminology 703. User 206 may then copy then replace the original document 701 terminology 703 text in an "edit html" view of the document 701. In another embodiment, user 206 is provided with just the span id value for the association or given the opportunity to define a custom id value of the user's choosing. The process then jumps to step 1011. Alternatively, if the determination in step 1006 of hard code in document is "No" then the process branches to step 1008.

In step 1008, a search phrase containing the selected terminology 703 is created. The document 701 is searched for the search phrase and if more than one occurrence is found then the search phrase is increased in size to contain additional characters to the left and/or right of the selected terminology 703 until only one unique occurrence is found in document 701. Then in step 1009 the position of the selected terminology 703 within the search phrase is determined. Alternatively, the search phrase can itself be searched for the selected terminology 703 where an occurrence integer is determined if more than one occurrence is found. The process continues to step 1010.

In step 1010, the DOM of document 701 is modified by computer code, such as a javascript function, that replaces terminology 703 with the same terminology surrounded by span tags such as <span id=a class=b>terminology</span>. The process continues to step 1011.

In step 1011, an event handler is created for the span occurrence(s) and is configured to invoke viewer 500 to display the new pose 300 when user 206 clicks or rolls over terminology 703. Cascading style sheets for class=b may be used to display an indicium next to the terminology to communicate to user 206 that the terminology can be clicked to see what it looks like in viewer 500, typically the indicium is a magnifying glass, eyeball, underline, or trademark, etc.

Then in step 1012, user 206 may add additional annotations to the new pose 300 such as dimensions, text, arrows, or pose-graphics 306, etc. A dimension may be added by activating the measure tool in viewer 500 and dragging to the desired positions, followed by clicking a save button in the editor dialog box. Arrows may be added by clicking "add arrow" button in the editor dialog box or dragging an "arrow" depiction from the editor dialog box to the viewer 500 and dropping. The arrow or other annotations may be moved or resized within viewer 500 by utilizing their handles. Similar actions can be used to add text, pose-graphics 306, such as alternate image capture type or additional detail. Each pose-annotation 305 can have an event handler associated with it where user 206 clicking or rolling over the annotation in viewer 500 can affect document 701 such as, cause an alert box to pop-up, load in a new subject object 100, log the event on the viewer analytics server, or signal an answer to a test question, etc. The process ends after user 206 adds all the annotations they desired.

If back in step 1005, the determination was "No" to the question of "single occurrence?" then the process branches to step 1013. In step 1013 the document is searched for all occurrences of the selected terminology 703 and each is highlighted. User 206 may then unselect any occurrences they do not want associated with the new pose 300. If any one occurrence is unselected then a list of integers to include/exclude is created to represent the occurrence order, otherwise all occurrences are associated so no list is required. After user 206 indicates to continue, the process jumps to step 1010 as discussed above.

Once user 206 finishes all desired associating terminology 703 to poses 300, they can then store/save all of the information to the server hosting subject object 100, to the server hosting document 701 if it is different, or to a third server with an appropriate configuration. Generally the document 701 address and/or server name is included in the pose-association dataset. The associations can be configured to be global for all documents 701 on a particular server, all servers; or be local for a specific document 701 name hosted on a particular server name; and/or for different groups of users. A subject object 100 can require a user 206 to login before any associations created can be stored/saved and or a moderator must approve any additions or changes. Before the changes are approved for a live website by default, unapproved changes are seen on a browser by manually adding an additional attribute to the document address, such as "site1.com/doc1.htm?showversion=abc". Viewer 500 code running on the client computer, searches the browser address bar URL for "showversion=" and then retrieves the appropriate data that has not yet been approved for the general public "live site". A cookie may also be stored on the client computer to always show the "latest" version apposed to the "live" version that has been fully approved.

Analytic Reports for Product Features, Zoom, Measure, Path, Pause

Figure 11:
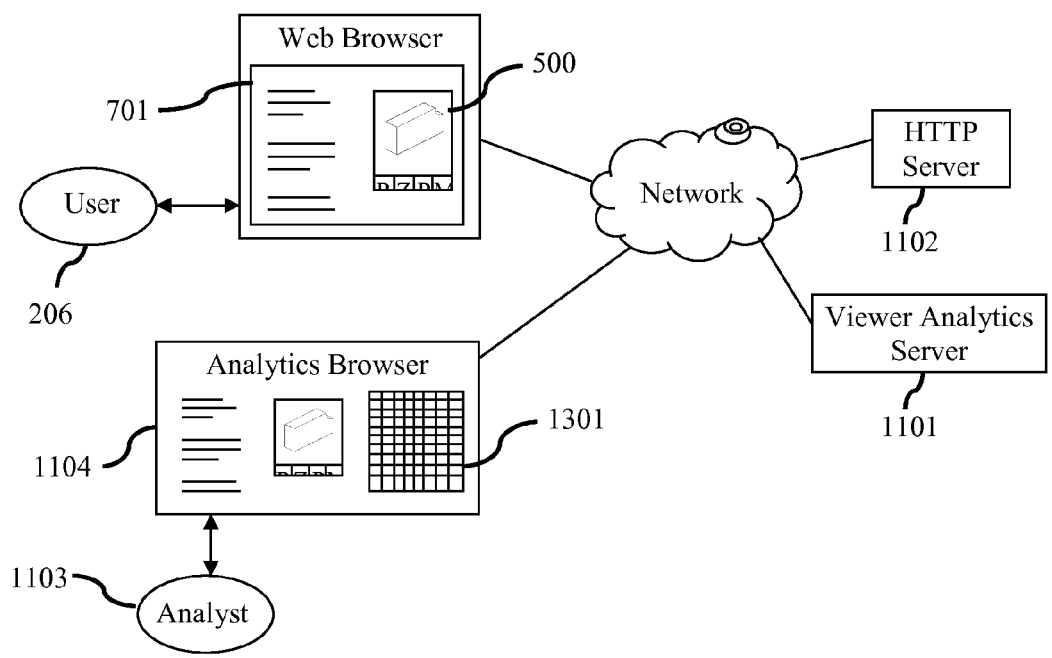
FIG. 11 depicts a network of viewer analytics server, client, analyst, and http server.

Referring to FIG. 11, in one embodiment of the present invention, viewer 500 calculates viewer analytics data and sends the calculated viewer analytics data to a viewer analytics server 1101 in step 809 of FIG. 8A and logger component 630, supra. The viewer analytics server 1101 receives, records, and processes the viewer analytics data to establish viewer analytics information. In one embodiment of the present invention viewer 500 creates a HTTP query string comprising the viewer analytics data and sends the HTTP query string to viewer analytics server 1101 or to a HTTP server 1102 with standard web browser query functionalities. See EXS. 1 and 2 for examples of the HTTP query string.

[EX 1] http://www.site.com/

"http://www.site.com/" is a URL of viewer analytics server 1101 or HTTP server 1102 from which the webpage is retrieved.

[EX 2] http://www.site.comPpg=www.site.com/product1/& ob=r0005 & thetaAngle=90 & phiAngle=45 & xpan=30 & ypan=50 & zoom=2 & terminology=power_crank & message=3 & timestamp=1234

As in EX 1, "http://www.site.com/" represents the URL of viewer analytics server 1101 or HTTP server 1102. "/?pg=www.site.com/product1/& ob=r0005 & thetaAngle=90 & phiAngle=45 & xpan=30 & ypan=50 & zoom=2 & terminology=power_crank & message=3 & timestamp=1234" represents the viewer analytics data being sent to viewer analytics server 1101 that comprises the URL of document 701 "pg=www.site.com/product1/", the subject object 100 "ob=r0005", the pose angle "thetaAngle=90", "phiAngle=45", the pose center (pan) "xpan=30", "ypan=50", the pose zoom "zoom=2", the terminology 703 clicked by user to invoke the pose "terminology=power crank", the version for a particular style of wording of the marketing message "message=3", and the timestamp of when this pose was displayed "timestamp=1234". Other embodiments can have additional or fewer parameters sent to viewer analytics server 1101, such as, shopping cart user id, subscription id, ASP session identifier, etc.

In one embodiment of the present invention, the viewer analytics data is gathered from viewer 500 and sent to viewer analytics server 1101 by JavaScript code embedded in document 701 or JavaScript code loaded by viewer 500 and inserted in to the document 701 DOM. In contrast to, viewer analytics data is sent directly from viewer 500 code implementing step 809.

Figure 12:
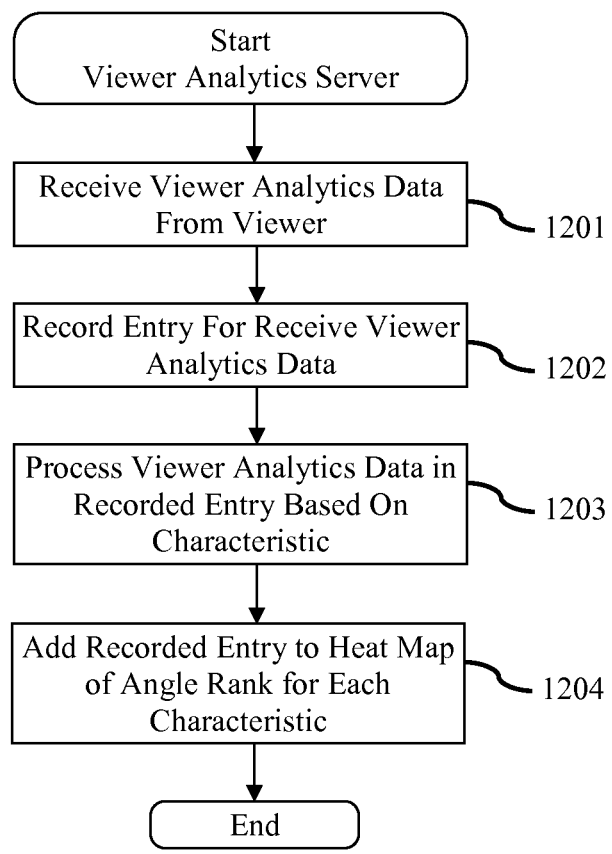
FIG. 12 is a flowchart for creating viewer analytics information.

FIG. 12 is a flowchart depicting an example method for determining viewer analytics information, wherein the method is performed by viewer analytics server 1101, in accordance with the embodiments of the present invention. In step 1201 viewer analytics server 1101 receives the viewer analytics data sent by viewer 500 in step 809, supra.

In step 1202, viewer analytics server 1101 records an entry of the received viewer analytics data.

In step 1203, viewer analytics server 1101 processes the viewer analytics data in the recorded entry to calculate angle ranks for different characteristics. The rank of an angle is based on one or more characteristics, such as but not limited to: the number of times the angle is displayed in viewer 500; the number of times the duration of time the user stops on the angle before continuing to rotate on; the number of times user 206 releases the drag at that angle; the number of times user 206 zooms-in on that particular angle; pans; measures; or clicked a terminology, and/or for a particular message version, etc.

In step 1204, for each characteristic, viewer analytics server 1101 adds the processed viewer analytics data of the recorded entry to a heat map of all possible angles from which subject object 100 can be displayed in viewer 500. When an analyst 1103 makes a query to viewer analytics server 1101 for a set of viewer analytics information, each characteristic is assigned a weighting of importance that factors into calculating the rank of each angle. Setting a weighting factor of zero effectively excludes any contribution of the associated characteristic, thereby helping to interpret what the aggregated data reveals about user's 206 interests in different subject objects' 100 features 409. Stored sets of weightings can be viewed by a pull down selection box of names associated with each stored set. A named set can be saved or stored and can comprise a check box, or a numeric value of the weighting next to each characteristic name. Alternatively, the current weightings can be inputted in input boxes next to the heat map. In one embodiment, the displayed heat map is calculated on the analyst's 1103 client computer 1104 using locally stored weightings for the different characteristics, where viewer analytics server 1101 sends to analyst's client computer 1104 the independent viewer analytics information for each characteristic.

The heat map of angle ranks shows respective frequency of user actions for respective pose angles 301 of subject object 100. The heat map provides viewer analytics information for the subject object 100 that can reveal which feature 409 of subject object 100 is most interesting to visitors of a website. The heat map can also show the effectiveness for user engagement of different versions of marketing message styles or wordings that cause user 206 to interact with viewer 500. In some examples, a heat map may be a graphical, visual, textual, numerical, or other type of data representation of activity involving viewer 500 that provides, as an example, density patterns that may be interpreted. When interpreted, density patterns may reveal areas of user interest, disinterest, or the like to determine the appeal of subject object 100 design, an online advertisement, editorial article, or other type of content presented on the website, or training document. Heat maps may, in some examples, utilize different colors or shades or hatch patterns or a combination of them to represent the relative density of a user's interaction with the viewer 500. For example, a different color may indicate a different characteristic, such as releasing the mouse button on a pose angle 301 is red, and zooming in while on that pose angle 301 is yellow, with the shading of color to indicate the frequency of that characteristic occurring over a specified time period. Different heat maps of different time periods may be shown in video form where every one second of video frame rate a new time period is displayed to indicate user interaction changes over a period of months and can be related back to advertizing campaigns.

Figure 13:
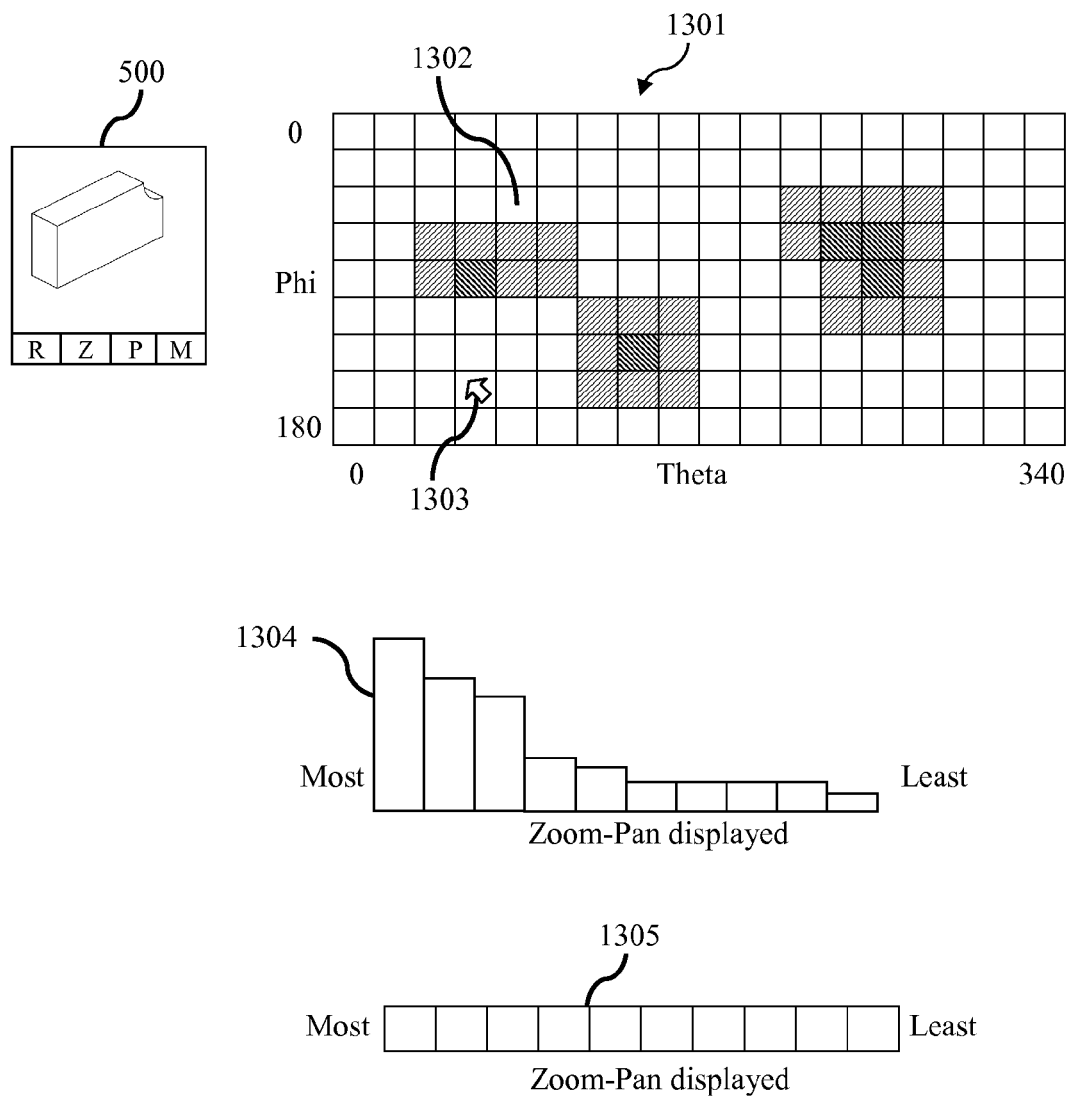
FIG. 13 is an example heat map of viewer analytics information.

FIG. 13 depicts an example heat map 1301 comprising a grid of 18 columns by 9 rows where each square represents a different viewable angle of subject object 100. The x-axis of the heat map represents Theta 107 and the y-axis represents Phi 104. For example, a square 1302 at the intersection of column 5 and row 3 is associated with a Theta 107 angle of eighty degrees and Phi 104 angle of forty degrees. Moving pointer device's 205 arrow 1303 over each square 1302 invokes viewer 500 to rotate subject object 100 to the respective angle associated with the particular square 1302. Each square's 1302 color, luminous, hue, transparency, darkness, or hatching pattern, is proportional to the rank of the angle.

Moving pointer device's 205 arrow 1303 over a sorted histogram 1304 invokes viewer 500 to display intervals (bins) of zoom and pan data for the currently displayed subject object 100 pose-angle 301. For example, moving pointer 1303 over the one end of sorted histogram 1304 invokes viewer to zoom-in and pan to the "most" frequently displayed pose-zoom 302 and pose-center (pan) 303 combination (such as zooming-in on the "power crank" feature 409a), similarly, moving pointer 1303 over the other end invokes viewer 500 to display the least frequent combination for the currently displayed pose-angle 301 (such as the upper left corner of subject object 100 at that pose-angle 301). Sorted histogram 1304, may alternatively be orientated such that the bars are horizontal and comprises text near each bar that communicates the numeric values of the pose attribute(s) described, such as zoom=2.3 pan=0.3, 0.2 so that a printout of the page can capture the information. Additional sorted histograms 1304 can be used to display the most/least frequent measurements taken or other characteristics on the currently displayed pose-angle 301. Sorted histogram 1304 can be any frequency density indicium such as a standard histogram bar graph with a bell shape, or one as shown with the intervals re-ordered (sorted) left to right based on highest-frequency of occurrence so its shape will appear like a standard "cumulative histogram" although the data is not cumulated. For example, another frequency density indicium 1305 is a rectangular scroll-bar, slider, or table such as ten columns by one row, that analyst 1203 can interact with to display most/least frequency pose 301 properties in viewer 500 for the currently displayed pose-angle 301. In one embodiment, a second heat map (not shown in figure) within viewer 500 and overlaid, in a semi-transparent manner, on top of subject object 100 can communicate additional viewer analytics information related to the currently displayed pose-angle 301, such as pointer position, pan, zoom, or measure characteristics.

In one embodiment of the present invention, each square 1302 of heat map 1301 contains a small thumbnail image of the respective angle of subject object 100. Further, interactivity can be achieved by mousing over or clicking a square 1302 to pop-up a larger view of that angle. Other embodiments of heat map 1301 do not have a grid, rather, one or more pixels in heat map 1301 can represent an angle of subject object 100 for the case of viewer displaying a three dimensional numeric model where any arbitrary angle may be calculated (rendered) and displayed. The aggregation of the number of times an angle is visited can be averaged for a given range of angles resulting in thicker path lines in the heat map and/or blurring of the data. Heat map 1301 may also be wrapped around a cylinder or other shape to provide more visually pleasing analytics reports.

Analytic Reports for "Marketing Message" Evaluation

In one embodiment of the present invention, alternately providing two or more different versions of a marketing message to different website users and ranking the effectiveness of the different messages by how many users click on associated terminology 703 within paragraph 702. The more engaged the user is by the story in the message, the more likely they are to click on terminology 703 to find out more. Clicking on terminologies 703, or lack there of, can also indicate how much of a document a user has read, and therefore provides metrics on the writing style and words chosen to communicate the marketing message. User 206 interacting with viewer 500 user-interface 600 can also be a factor to calculate the marketing message ranking (metrics). The document 701 server can provide different documents that comprise the different marketing messages to different users, or alternatively viewer 500 may replace a message paragraph 702 with a different version after document 701 is first loaded. The advantage is the number of different marketing messages can be stored on the viewer 500 server and the logic of which message to display is controlled by viewer 500 while leaving the original stored copy of the document 701 unchanged on the simple document 701 server having no logic. Alternatively, the original document 701 may contain two versions of marketing message paragraphs with the second version set to hidden, in this embodiment viewer 500 may apply style sheet properties to hide the first version and show the second version. The analytics of the marketing message can also be used to rank educational material on its ability to engage students or other examples such as, new articles, product reviews, or generally any kind of writing. See EX. 3 and EX. 4 below for examples of different marketing message versions both using "{power crank}" as a terminology 703 that when clicked invokes viewer 500 to show the associated pose 301 that best points out what a "power crank" is, looks like, and where it is located.

[EX 3] The widget contains a {power crank} on the back near the bottom right. Use it to recharge the widget when the power is low.

[EX 4] The {power crank} ensures you will always be in contact even while hiking in the forest.

A massage analytics information comprises calculating a message ranking and is accomplished by recording which message is presented to a user and logging the user interactions with the clickable terminology(s) 703 and viewer 500 user-interface 600 as discussed above by implementing viewer analytics data, with viewer analytics server 1101. Calculating a message ranking (massage analytics information) can be based on, frequency, order, and/or time between clicking terminology 703. The order of terminology 703 clicked can indicate the eye movement around the document to what grabs the user's attention to read first. Message analytics information is generally a metric such as a numeric value, called a message ranking, assigned to each version of the message, but can also be a bar, color, or some indicium that communicates relative rank. An analyst can compare the message rank value to evaluate the relative effectiveness of the different message wordings. The delta time between clicking terminologies 703 can indicate if the user is quickly skimming the words or reading slowly for understanding. The normal user reading pace is determined by the time delta between term clicks for a given number of words between terms. A shorter or longer time between expected term clicks will indicate slow engaged reading, skimming because of lack of interest, or various other factors. It is possible to estimate the number of users who are new to an industry because they will be unfamiliar with industry terminology 703 and will then show a larger average click number, which suggests that the advertising campaign is reaching new customers rather than those with experience and understanding of the industry jargon. The type of information gained from various studies is highly dependent on the message content and how it is presented.

Analytics for Student Testing

Students are typically tested on the information learned such as names of different parts of animals or names of different parts of general subject objects 100 such as a car engine. In one embodiment of the present invention, evaluating a student's understanding in the form of a skill testing question which contains associated terminology 703 or terminologies 703 that cause viewer 500 to rotate to and indicate different parts of subject object 100. The skill testing question can be presented in multiple choice format, where there are 2 or more answers provided and a student must choose the correct answer, where at least one of the answers contains an associated terminology 703 or indicium that orientates and points out a feature on subject object 100. For example a question may be "The power crank is show in which of the following positions?: A first, B second, or C none of the above" where clicking on "A" or "first" or some other related indicium causes viewer 500 to show pose 401 and clicking on "B" causes viewer 500 to show pose 407. The answers may be presented with such things as, radio buttons, or check boxes, or in a list box format where selecting from the list, or scrolling through the list, causes viewer 500 to show an associated pose of subject object 100, etc. Skill testing questions in yes/no format behave similarly with terminology 702 within the question sentence, such as "Does this position of the object show the power crank? Y/N" where clicking on the terminology 702 "this position" causes viewer 500 to show pose 401.

In one embodiment of the present invention, functionality within viewer 500 communicates with document 701 when an annotation is clicked whereby an alternate form of skill testing question can be "Rotate the object and click on the power crank" where the user clicks on an annotation, such as a red dot, within viewer 500 to indicate (or select) their answer. A more sophisticated answering methodology allows for more than one correct answer such that the student only needs to rotate to any angle that shows the feature in question, and further requires the student to zoom-in to indicate a more particular aspect of the object. For each subject object 100 angle a range of zoom and pan positions indicate the correct answer, or even a range of annotation positions.

In contrast to a computer automated test score, a real person may be required to check the skill testing questions for correct answers. In this case the student may be asked "Rotate to the power crank and draw a circle around it" where the student saves the pose 300 attributes as the answer and the tester person makes the judgment of correctness by viewing the saved pose 300 answer in viewer 500. In this example, viewer 500 communicates with document 701 or a server to store the current pose 300 with a question id as the answer to the question.

In a hybrid of these techniques the computer system can slowly learn what the correct answer ranges are. In this embodiment the computer system automatically marks only correct answers and requires the tester person to judge the correctness of all non-correct answers, if the answer is deemed correct then the ranges are adjusted so that the tester does not need to make the judgment a second time or third time for different students. Similarly, the computer system can learn what are wrong answer ranges and not require the tester to manually mark the answer each time. To avoid mistakes in automated marking, a more robust system may require more than one judgment of the tester to alter a correct answer range. In this way the tester need only take the time to indicate if the answer is correct or wrong. If the tester has more time, the tester may draw out the range of correct answers for the angle answered.

In more complex skill testing questions, a correct sequence of user actions may be the answer, such as "Rotate to and click on the following anatomy in the following order: nose, claw, then mouth". In this case the time taken to perform the actions may be a factor of the evaluation criteria or for measuring such things as the student's reaction time.

To simplify the software and logic in the document 701 JavaScript, viewer 500 may retrieve from a server the correct answers to the skill testing question and then communicate with the document 701 only that the question was answered correct or wrong. The advantage of this embodiment is the author of the questions does not need to program correct answer ranges within the document 701 programming language. In contrast, within document 701*a* form <input/> tag of type "hidden" may be modified by viewer 500 to communicate correctness, or at the time of navigating to the next question, viewer 500 stores the current pose 300 as the answer, or evaluates the current pose 300 against correct answer ranges. Navigating to the next skill testing question may involve any number of user actions, such as but not limited to, clicking on a button in the document, clicking a standard html tag or element, scrolling down, or clicking a button in viewer 500. The student's answer may be stored on the server from which viewer 500 is retrieved or the server from which document 701 is retrieved.

Discussions Over the Phone with Synchronized Viewers

Figure 14:
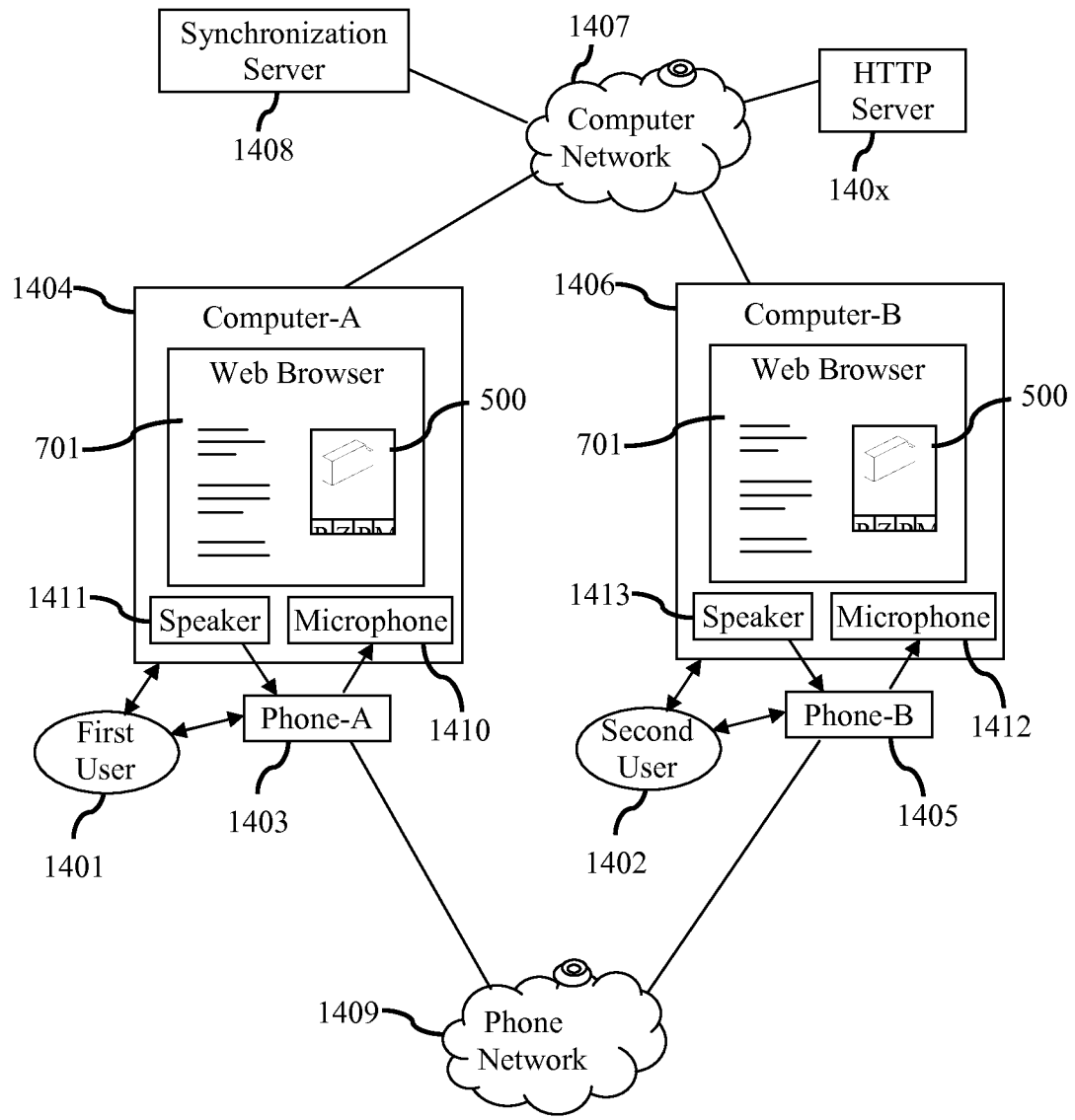
FIG. 14 depicts a synchronization diagram utilizing a computer and a phone network.

In one embodiment of the present invention depicted in FIG. 14, a first user 1401 can better communicate with a second user 1402 by talking over the phone while each uses viewer 500 to help discuss subject object 100. To make the discussion more affective, each user's viewer 500 is synchronized to display the same pose 300 of subject object 100 that the other user sees.

For example, first user 1401 operates a verbal communication device phone-A 1403 and a first computer-A 1404 which is displaying document 701 having viewer 500 display subject object 100. The first user 1401 can invoke change of displayed pose 300 of subject object 100 by clicking on terminology 703 associated with a predetermined pose 300 or by using user-interface 600 to rotate, zoom, pan, measure, create annotations, etc. The second user 1402 operates a phone-B 1405 and a second computer-B 1406 which has viewer 500 displaying the same subject object 100 as seen by first user 1401. Computer-A 1404 and computer-B 1406 are connected to a computer network 1407, such as an intranet or internet, and can bilaterally communicate network messages directly to each other or communicate with each other via a synchronization server 1408. Phone-A 1403 and phone-B 1405 communicate sounds with each other over a phone network 1409. In response to input from one of user 1401, 1402 to modify the pose 300 (user invoked pose) on their computer, those pose 300 attributes are then communicated to all other viewers 500 running on different computers in the synchronization session, resulting in all viewers 500 displaying subject object 100 in substantially the same way; the synchronization can be accomplished by storing a user invoked pose 300 with a pairing indicium on the synchronization server 1408, and each viewer 500 in the synchronization session periodically requests from synchronization server 1408 the latest pose 300 associated with the pairing indicium. The position of one user's mouse pointer within the viewer 500 may be indicated by a colored arrow in the other user's viewer 500. Various locking mechanisms can be implemented to prevent concurrent user invoked changes to the pose 300.

Synchronization Lock States and Pointer Positions

In one embodiment of the present invention, a synchronization lock can allow only one user 1401, 1402 to utilize the viewer user-interface 600 (unlocked), while all other viewers 500 in the synchronization session have their respective user-interfaces 600 disabled (locked). The locked viewers 500 can not change zoom, pan, or angle, however, the current mouse pointer position in a locked viewer 500 is communicated and displayed on all other viewers 500, typically as a pointer of a different color assigned to each user in the session. In addition, because there is a time lag in transmitting across computer network 1407 and displaying the correct position of the first user's 1401 pointer on the other person's (second user 1402 computer-B 1406) screen; first viewer 500 transmits the standard (white) mouse pointer's position to the second viewer 500, then second viewer 500 transmits back a confirmation position of the first users pointer received, first viewer 500 then displays a colored arrow at the confirmation position received. For example, if the first user stops the motion of the standard (white) mouse pointer for a period longer than the time lag, the colored arrow at the confirmation position will eventually obscure the standard (white) mouse pointer. If the confirmation position is close to the edge of the viewer 500 region such that the entire arrow is not visible (such as a north-west pointing arrow three pixels from the right edge of the region), then the arrow is rotated to point in a different direction such as south-east. Similarly, a confirmation pose 300 can be transmitted back, and once received toolbar buttons 502 can change color to communicate that the other computer is now displaying the same pose 300; or some other means besides changing toolbar buttons 502, such as an indicium in the corner of the viewer 500 for example a check mark, or an "X", or sound, or some other element changing color or grey level, or transparency.

One viewer 500, can be a synchronization master with extra controls that allow for managing which viewers 500 in the session are locked or unlocked. Where each viewer 500 is represented on the synchronization master's screen by a toggle button, upon clicking will pass control to that viewer 500 by changing its state to unlocked and the rest of the viewers 500 to a locked state. To communicate the lock state of a viewer 500 to its user, viewer toolbar 502 buttons are hidden if locked and shown if unlocked, (or grayed-out or disabled, etc.). The color of the viewer toolbar 502 buttons and mouse pointer can be different for each viewer 500 in the synchronization session to indicate to the user what their matching color of pointer is represented on the other viewers 500 in the session. For example first user 1401 has yellow toolbar buttons 502 and second user 1402 has blue toolbar buttons 502, then the position of the second user's 1042 pointer is displayed as a blue pointer in the first user's 1401 viewer 500, similarly, the position of the first user's 1401 pointer is displayed as a yellow pointer in the second user's 1042 viewer 500. In one embodiment of the present invention, a viewer 500 becomes unlocked if the mouse pointer is within the viewer 500 region and if the previously unlocked viewer 500 in the session does not have a mouse pointer within its respective viewer 500 region. In this example the first user 1401 verbally communicates over the phone network 1409 to the second user 1402 to move their pointer out of their viewer 500 to release their lock. One user 1401, 1402 can have master status, where priority is given to their lock state, for example if the second user's 1042 pointer is in the viewer 500 region then they always are immediately unlocked while all others are locked regardless of where their mouse pointers are positioned inside viewer 500 region or outside of viewer 500 region.

Initiating a Synchronization Session by Pattern of Sounds Over the Phone

Figure 15:
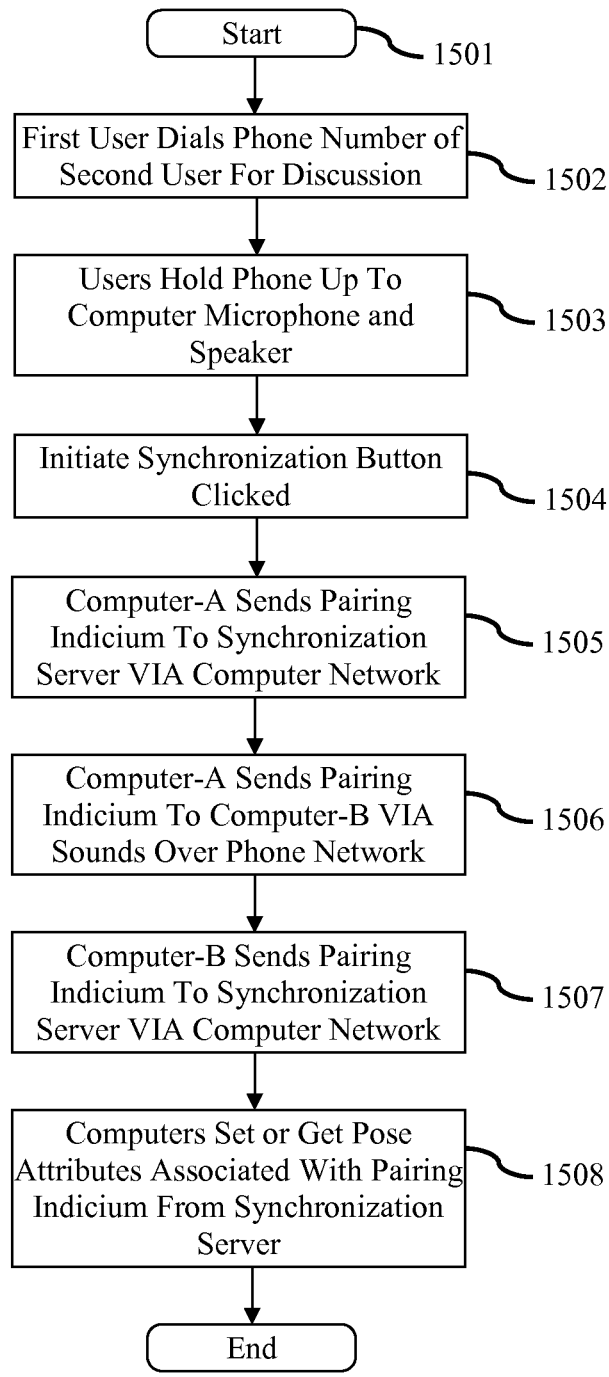
FIG. 15 is a flowchart for initiating a synchronization session utilizing sounds over a phone.

FIG. 15 shows a process that may be used, in one example embodiment, to initiate a synchronization session by pairing two computers using sounds. A single computer button press emits a pattern of sounds transmitted over the phone network 1409, instead of each user having to manually type in pairing indicium that establishes the synchronization between their computers over the computer network 1407. The synchronization session can be between two or more viewers 500 so that each viewer 500 displays the same subject object 100 with substantially the same pose 300.

The process begins in step 1501 when first user 1401 reading document 701 wants to verbally talk about subject object 100 with second user 1402 also reading document 701. In step 1502 first user 1401 dials the phone number of second user 1402 and engages in a brief discussion. In step 1503, first user 1401 holds phone-A 1403 up to a microphone 1410 and a speaker 1411 connected to computer-A 1404 and second user 1402 holds phone-B 1405 up to a microphone 1412 and a speaker 1413 connected to computer-B 1406. In step 1504, first user 1401 clicks an initiate synchronization button on computer-A 1404. In step 1505, computer-A 1404 communicates a pairing indicium with synchronization server 1408 by way of the computer network 1407. In one embodiment, computer-A 1404 generates and sends the pairing indicium to synchronization server 1408; Or alternatively, computer-A 1404 requests and receives the pairing indicium from, and generated by, synchronization server 1408.

In step 1506, computer-A 1404 communicates the pairing indicium to computer-B 1406 by way of the phone network 1409, where the pairing indicium is encoded to (or represented by) a pattern of sounds (audible signal) generated by speaker 1411 of computer-A 1404. In step 1507, microphone 1412 of computer-B 1406 receives the pattern of sounds from phone-B 1405 and decodes them back into the pairing indicium. Computer-B 1406 then communicates the pairing indicium to synchronization server 1408 by way of the computer network 1407.

In step 1508, viewers 500 on computer-A 1404 and computer-B 1406 periodically (such as every one second) query (get) from synchronization server 1408 the pose 300 attributes associated with the pairing indicium. For example using http://site.com/getpose.asp?pairing=abc123. If either first user 1401 or second user 1402 use an input device to modify the pose 300 of subject object 100 then the new user invoked pose 300 attributes are sent to (set) synchronization server 1408 where it is stored and associated with the pairing indicium, For example using http://site.com/setpose.asp?pairing=ab c123&Phi=90&Theta=45 &zoom=8. The new pose 300 is now ready to be requested (getpose) by other viewers 500 participating in the synchronization session using that pairing indicium.

Computer-B 1406 may be displaying viewer 500 within the same document 701 as computer-A 1404 or a different document 701 having such things as additional input fields or information appropriate for a customer service representative. In one embodiment, voice-over-IP software can be running on one or more of the computers 1404, 1406 instead of the phone system 1403, 1409, 1405.

Other software programs can utilize the above method of establishing (initiating) a synchronization session using a pattern of sounds sent over the phone during a conversation between two or more people. Some examples of software programs are: remote control of desktop applications, remote meeting applications, virus removal applications, CAD Computer Aided Drafting applications, photograph sharing applications, medical imagery applications, education teaching or collaboration applications, website browsers, webinars, or any application that can benefit from synchronizing all or part of what one person sees on their screen with another person's screen.

It is also noted that within the scope of the present invention, more than one pairing indicium can be used to synchronize two or more computers, where the synchronization server 1408 utilizes a lookup table that associates many pairing indicium with one particular synchronization session. Each new participating user may press an initiate synchronization button to transmit a pattern of sounds to at least one other existing user computer in order to be associated with their active synchronization session (or vice versa). The pairing indicium can be generated by the computers 1404, 1406 or the synchronization server 1508 or a combination of the two. The pairing indicium is generally a string of alphanumeric characters such as "abc123", but may also carry additional information such as a computer's ip address, webpage address, subject object 100 name, or the pose 300 attributes themselves. The pairing indicium itself can be a sound, where decoding by a computer to a string is not required; for example synchronization server 1408 can generate and send a sound file to computer-A 1404 and receive a recorded sound file from computer-B 1406 which is then compared by the synchronization server 1408. The pattern of sounds representing the pairing indicium is an audible signal of tones with varying duration of the tones and or varying duration of the silences between the tones, where the tones are a single pitch (such as Morse code using a frequency of three thousand hertz). Alternatively, the audible signal may be comprised of constant duration tones that vary in pitch (such as tone dialing telephones) to communicate each character in the pairing indicium string. Alternatively, the audible signal may comprise a computer synthesized voice on computer-A 1404 used in conjunction with voice recognition software on computer-B 1406. Alternatively, the audible signal from the computer speakers 1411, 1413 may have a frequency slightly higher than typical human hearing sensitivity such as above 16 kHz but still be within the specifications required to be transmitted through the atmosphere as a pressure-wave and across a verbal phone network system 1403, 1409, 1405.

In one embodiment of the present invention, a method of initiating a synchronization session between two or more viewers 500 is providing an input box that allows for manual typing of a pairing indicium which can be communicated verbally over the phone between the two users. Each user must enter the same pairing indicium; alternatively only first user 1401 must enter the predetermined pairing indicium generated by, and displayed by, second user's 1402 viewer 500; alternatively each user must type the different pairing indicium provided by each other viewer 500 in the synchronization session where synchronization server 1408 utilizes a lookup table. Another method of initiating a synchronization session is by way of a website link in an email or instant message sent from first user 1401 to second user 1402. Pairing indicium may be stored in a cookie for subsequent synchronization sessions in the future where first user does not require initiation input because a database stored the pairing indicium with the incoming phone number presented in call-display phones or call-me-back services from a website link to second user who inputs the phone number as the pairing indicium or query for the database. In all example embodiments, a confirmation dialog box may popup each time a new user is added to the synchronization session. The viewer 500 can also receive a synchronization message to load in a new subject object 100 or make the web browser load in a new document.

Pasting Text to a Second Computer by a Pattern of Sounds Over the Phone

In one embodiment of the present invention, text copied to a clipboard on computer-A 1404 can be pasted on computer-B 1406 via a pattern of sounds that are transmitted over the phone network 1403, 1409, 1405. While first user 1401 is already on the phone in a discussion with a second user 1402, such as a sales-person to customer situation, an email-address or website address can easily and accurately be communicated.

Second user 1402 invokes focus to an input element and shows a pop-up menu by right-clicking an input box or text position in a document or browser address bar, then clicks a "paste via phone" item in the pop-up menu. Second user 1402 says to first user 1401 "ready, go ahead and send it" while holding phone-B 1405 up to computer-B 1406 microphone 1412. First user 1401 selects text in a document by clicking or dragging. First user 1401 then presses the right-hand mouse button to show a pop-up menu and clicks a "send to/via phone" item while holding phone-A 1403 up to computer-A 1404 speaker 1411. Computer-A 1404 encodes the selected text into a pattern of sounds which are transmitted through speaker 1411 to phone-A 1403, through phone network 1409, then from phone-B 1405 to microphone 1412 where computer-B 1406 decodes the sound pattern back into text, which is then pasted in the input element having focus.

The selected text is generally an email-address, product model number, phrase, paragraph, mailing address, electronic business card, meeting appointment, calendar event, or graphic, etc. The sound pattern may also encode the selected text type, such as "meeting appointment", where a software application can invoke focus automatically to the appropriate receiving input element and paste the selected text. Alternatively, receiving computer-B 1406 can always be listening for a sound pattern and store the decoded selected text in the local clipboard by default. Second user 1402 can then paste to the appropriate input element at any time after the sound pattern has been received.

Computer System and Infrastructure

Referring again to FIG. 2, microprocessor 201 is coupled to and communicates with memory devices 202 and 203, input device 204, output device 209, pointer device 205, and updates graphics displayed on display screen 200. The output device 209 may be, inter alia, a nontransitory storage device, a hard-drive, DVD, CD, computer readable medium, internet connection, network connection, flash ram, a printer, a plotter, a computer screen, a magnetic tape, a removable hard disk, a floppy disk, a Network Interface Card (NIC), a Voice/video Over Internet Protocol (VOIP) adapter, a wireless adapter, a telephone adapter, a dedicated circuit adapter, an audio and/or visual signal generator, a light emitting diode (LED), etc. Input device 204 may be, inter alia, a keyboard, a mouse, a keypad, a touch-screen, a voice recognition device, a sensor, a NIC, a VOIP adapter, a wireless adapter, a telephone adapter, a dedicated circuit adapter, a remote button, a character recognition, a video camera for receiving gestures, etc. Pointer device 205 may be, inter alia, a mouse, a touch screen, a touch pad, a tablet, a track ball, an accelerometer, a video camera for tracking eyes or hand gestures, a joystick, etc. The memory devices 202 and 203 may be, inter alia, a cache, a dynamic random access memory (DRAM), a read only memory (ROM), a hard disk, a floppy disk, a magnetic tape, an optical storage such as a compact disk (CD) or a digital video disk (DVD), etc. The memory device 203 includes a computer code 208 which is a computer program that comprises computer executable instructions. The computer code 208 includes, inter alia, an algorithm used for determining viewer analytics information, message analytics information, viewer functionality, synchronization functionality, etc, according to the present invention. The microprocessor 201 executes the computer code 208. The memory device 202 includes input data 207. The input data 207 includes input required by the computer code 208. The output device 209 displays output from the computer code 208. Either or both memory devices 202 and 203 (or one or more additional memory devices not shown in FIG. 2) may be used as a computer usable storage medium (or a computer readable storage medium or a program storage device) having a computer readable program code embodied therein and/or having other data stored therein, wherein the computer readable program code comprises the computer code 208. Generally, a computer program product (or, alternatively, an article of manufacture) of the computer system may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collection rules of the present invention. Thus, the present invention discloses a process for supporting computer infrastructure, comprising integrating, hosting, maintaining, and deploying computer-readable code into a computing system, wherein the code in combination with the computing system is capable of performing a method of determining viewer analytics information, viewer functionality, synchronization functionality, etc, according to the present invention.

In another embodiment, the invention provides a business method that performs the process steps of the invention on a subscription, advertising and or fee basis. That is, a service provider, such as a Solution Integrator, can offer to create, maintain, support, etc. a computer infrastructure that performs the process steps of the invention for one or more customers. In return, the service provider can receive payment from the customer(s) under a subscription and/or fee agreement, and/or the service provider can receive payment from the sale of advertizing content to one or more third parties.

While FIG. 2 shows the computer system as a particular configuration of hardware and software, any configuration of hardware and software, as would be known to a person of ordinary skill in the art, may be utilized for the purposes stated supra in conjunction with the particular computer system of FIG. 2. For example, the memory devices 202 and 203 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may generally be referred to herein as a "circuit", "module", "component", or "system". Furthermore, the present invention may take the form of a computer program product embodied in any tangible medium of expression having computer readable program code embodied in the medium.

Any combination of one or more computer usable or computer readable medium(s) 202, 203 may be utilized. The term computer usable medium or computer readable medium collectively refers to computer useable and/or computer readable storage medium 202, 203. The computer-usable or computer-readable medium 202, 203 may be, inter alia, an electronic, magnetic, optical, electromagnetic, infrared, or semiconductor system, apparatus, a device, or any suitable combination of the foregoing. More specific examples (a non-exhaustive list) of the computer-readable medium 202, 203 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. Note that the computer-usable or computer-readable medium 202, 203 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 202, 203 may be any medium that can contain, or store a program for use by or in connection with an instruction execution system, apparatus, or device.

Computer code 208 for carrying out operation of the present invention may be written in any combination of one or more programming languages, including an object oriented programming language such as Java, Smalltalk, C++ or the like and conventional procedural programming language, such as the "C" programming language, JavaScript programming language, or similar programming languages. The computer code 208 may execute entirely on the user's computer, partly on the user's computer, as a stand-alone software package, partly on the user's computer and partly on a remote computer or entire on the remote computer or server. In the latter scenario, the remote computer may be connected to the user's computer through any type of network, including a Local Area Network (LAN), Blue-Tooth, or a Wide Area Network (WAN), or the connection may be made to an external computer (for example, through the Internet using an Internet Service Provider ISP).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 208" in this specification. These computer program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 202, 203 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded into a computer or other programmable data processing apparatus to cause a series of operational step to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowcharts illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A first computer system comprising one or more processors and a display screen and an input device, configured to:
    a. display a document on said display screen, wherein said document comprises a paragraph, wherein said paragraph comprises a terminology; and
    b. provide a subject object viewer region on said display screen; and
    c. display a subject object within said viewer region; and
    d. update said viewer region to display a predetermined pose of said subject object in response to a user input associated with said terminology; and
    e. receive a user-interface input for manipulation of said subject object to an arbitrary pose;

further configured to calculate viewer analytics data comprising pose properties; and configured to transmit the calculated viewer analytics data to a viewer analytics server executing on another computer system through a communication network such that the transmitted viewer analytics data are utilized to generate a viewer analytics information that describes properties of poses displayed in said viewer region;

wherein said viewer analytics server further configured to receive the transmitted viewer analytics data; add the viewer analytics data to said viewer analytics information, wherein said viewer analytics information is a heat map of possible pose angles, the heat map comprising at least one pose angle rank that a user had rotated to:

where releasing the mouse button on a pose angle is a first color, and zooming in while on that pose angle is another color, with the shading of color to indicate the frequency of that characteristic occurring over a specified time period.

2. The system of claim 1, wherein said viewer region is embedded within said document.

3. The system of claim 2, further configured to reposition said viewer region nearer to said terminology in response to a user input associated with said terminology.

4. The system of claim 1, wherein said predetermined pose comprises an additional detail graphic.

5. The system of claim 4, wherein said additional detail graphic comprises a second imaging technique of said subject object.

6. The system of claim 1, further configured to first search said document for said terminology, if found then configure said terminology to accept user input and associate with said predetermined pose.

7. The system of claim 6, wherein said subject object is rotatable by a user interface, whereby the back-part of the subject object can be seen.

8. The system of claim 7, wherein said subject object is captured imagery of one from the group of animal, plantae, and movable manufactured physical object.

9. The system of claim 1, further configured to first search said document for a predetermined phrase comprising said terminology, if found then configure that terminology occurrence to accept user input and associate with said predetermined pose; wherein said predetermined phrase comprises a plurality of words; whereby typically one occurrence of the terminology is associated with the predetermined pose.

10. The system of claim 1, further configured to wait for a first occurrence of said user input associated with said terminology before providing said viewer region and displaying said subject object.

11. The system of claim 1, further configured to search said document for a holding image before providing said viewer region and displaying said subject object related to said holding image; whereby a simple html IMG tag with a specially crafted filename can hold the location for and will be replaced by a multimedia player of substantially the same size and position.

12. The system of claim 11, wherein the filename of said holding image comprises a predetermined pattern.

13. The system of claim 1, further configured to: receive user-interface input for manipulation of said subject object to a new pose; and detect a user selection of a new terminology, thereby said new terminology is associated with said new pose.

14. The system of claim 1, further configured to: receive user-interface input for manipulation of said subject object to a new pose; and detect a user selection of a new terminology; and detect a user input for create-an-association, thereby said new terminology is associated with said new pose.

15. The system of claim 14, further configured to provide a user with an encoding for associating said new terminology with said new pose; whereby the user can manually modify the document file with the encoding.

16. The system of claim 15, wherein said encoding comprises said new terminology sandwiched between starting and ending tags.

17. The system of claim 9, further configured to:
a. receive user-interface input for manipulation of said subject object to a new pose;
b. detect a user selection of a new terminology;
c. detect a user input for create-an-association then expand a new phrase comprising said new terminology until only one occurrence of said new phrase is found in said document and associate said new phrase and said new terminology with said new pose.

18. The first computer system of claim 1, further configured to: communicate bilaterally with a second computer system; and wherein said second computer system is operable by a second user and said first computer system is operable by a first user; and wherein said second computer system configured to display a first user invoked pose displayed on said first computer system and said first computer system configured to display a second user invoked pose displayed on said second computer system; whereby both users can show each other different features of the subject object in the viewer region and discuss over the phone more effectively.

19. The system of claim 18, wherein said first computer system configured to communicate pose attributes bilaterally with said second computer system via a synchronization server computer system; and wherein said synchronization server configured to receive a first pairing indicium from said first computer system and a second pairing indicium from said second computer system.

20. The system of claim 19, wherein at least one pairing indicium is communicated via a computer generated audible signal, whereby users already engaged in a phone conversation can easily initiate a synchronized session between their computers by holding the phone up to the computer speaker and or microphone and clicking a button.

21. The system of claim 20, wherein said audible signal comprises variable durations of a plurality of tones and variable durations of silences between said tones.

22. The system of claim 20, wherein said audible signal comprises tones of more than one pitch.

23. The system of claim 19, wherein said first pairing indicium is equivalent to said second pairing indicium.

24. The system of claim 1, wherein said viewer analytics information further comprises at least one frequency density indicium of pose properties for said at least one pose angle rank; whereby a user can move a pointer over a sorted histogram to invoke the viewer to display the most frequent zoom and pan combination for the current pose angle displayed.

25. The system of claim 24, further configured to display pose angles in response to user input within the respective region of said heat map; whereby a user can move a pointer over an angle rank in the heat map to see that angle displayed in the viewer region.

26. The system of claim 1, further configured to calculate viewer analytics data comprising pose properties and a message version number; and configured to transmit the calculated viewer analytics data to a viewer analytics server executing on another computer system through a communication network such that the transmitted viewer analytics data are utilized to generate a message analytics information that describes the effectiveness of a message text.

27. The system of claim 26, further configured to replace said message text with a different version of message text.

28. The system of claim 26, wherein said message analytics information is a metric representing the message ranking based on frequency of user input with said terminology.

29. The system of claim 1, wherein said at least one pose angle rank based on one or more of a plurality of characteristics selectable by a user.

30. The system of claim 29, wherein one said characteristic is zooming in while at the respective angle.

31. The system of claim 29, wherein one said characteristic is panning while at the respective angle.

32. The system of claim 29, wherein one said characteristic is completing a rotation by releasing a drag at the respective angle.

33. The system of claim 29, wherein said angle rank is based on input associated with said terminology for the respective angle.

34. The system of claim 32, wherein at least one of said characteristic having a weighting selectable by a user.

35. The system of claim 18, wherein the received pose is communicated back to the computer system invoking the pose and indicated to the user invoking the pose; whereby the invoking user can be assured by color change or other indicium that the other user is now seeing the same intended pose.

36. The system of claim 18, further configured to;
   a. communicate a plurality of current pointer positions within said viewer region to each computer system;
   b. communicate a pointer confirmation position back to the respective owner of said current pointer; and
   c. display said pointer confirmation position to the respective owner of said current pointer;
      whereby each user can be assured that other users are now seeing the intended pointer position by way of a colored arrow that follows the current pointer of the owner.

* * * * *